United States Patent
Sharma

(10) Patent No.: US 7,434,047 B2
(45) Date of Patent: Oct. 7, 2008

(54) SYSTEM, METHOD AND COMPUTER PROGRAM PRODUCT FOR DETECTING A ROGUE MEMBER IN A MULTICAST GROUP

(75) Inventor: Atul Sharma, Westford, MA (US)

(73) Assignee: Nokia, Inc., Irving, TX (US)

( * ) Notice: Subject to any disclaimer, the term of this patent is extended or adjusted under 35 U.S.C. 154(b) by 612 days.

(21) Appl. No.: 11/027,274

(22) Filed: Dec. 30, 2004

(65) Prior Publication Data

US 2006/0149965 A1    Jul. 6, 2006

(51) Int. Cl.
*H04L 9/08* (2006.01)
*H04L 9/32* (2006.01)

(52) U.S. Cl. .................. 713/163; 380/279
(58) Field of Classification Search ............ 713/13, 713/162–163, 150, 153, 160; 709/246; 380/259, 380/277–279, 282–285
See application file for complete search history.

(56) References Cited

U.S. PATENT DOCUMENTS

| | | | |
|---|---|---|---|
| 6,629,243 B1 | 9/2003 | Kleinman et al. | |
| 6,910,135 B1* | 6/2005 | Grainger | 726/23 |
| 6,941,457 B1 | 9/2005 | Gundavelli et al. | |
| 7,127,743 B1* | 10/2006 | Khanolkar et al. | 726/23 |
| 7,277,952 B2* | 10/2007 | Nishanov et al. | 709/229 |
| 2003/0035370 A1* | 2/2003 | Brustoloni | 370/229 |
| 2003/0218568 A1 | 11/2003 | Kober et al. | |
| 2005/0044354 A1* | 2/2005 | Hagerman | 713/160 |
| 2005/0111668 A1 | 5/2005 | Raikar | |
| 2005/0132166 A1* | 6/2005 | Saffre | 712/26 |
| 2006/0005007 A1* | 1/2006 | Sharma | 713/153 |
| 2007/0143600 A1* | 6/2007 | Kellil et al. | 713/163 |

FOREIGN PATENT DOCUMENTS

JP    2002124944 A  *  4/2002
WO   WO 01/03364 A1    1/2001

OTHER PUBLICATIONS

Dan Boneh, Glenn Durfee, Matt Franklin; *Lower Bounds for Multicast Message Authentication*; 2001; 16 pages; Lecture Notes in Computer Science.

(Continued)

*Primary Examiner*—Gilberto Barron, Jr.
*Assistant Examiner*—Hadi Armouche
(74) *Attorney, Agent, or Firm*—Alston & Bird LLP

(57) ABSTRACT

A system for multicasting a data packet in a multicast group includes a network entity, and a plurality of members of the multicast group. A member can notify the network entity of a rogue member of the group claiming an identity of a spoofed member of the group. In response to being notified, the network entity can distribute, to at least the members of the group other than the spoofed member, different versions of a symmetric key associated with the spoofed member. The member notifying the network entity of the rogue member can then receive a next data packet and a code for the next data packet, the code having been generated at the rogue member using a version of the symmetric key associated with the spoofed member such that the rogue member can be identified based upon the version of the symmetric key.

27 Claims, 13 Drawing Sheets

OTHER PUBLICATIONS

Ran Canetti, Juan Garay, Gene Itkis, Daniele Micciancio; Moni Naor, Benny Pinkas; *Multicast Security: A Taxonomy and Some Efficient Constructions*; Mar. 1999; 9 pages; The Conference on Computer Communications, No. 1.

Thomas Hardjono, Lakshminath R. Dondeti; *Multicast and Group Security*; Jun. 2003; 334 pages (Selected pp. 5-13; 45-51; 63-67; 280-281); Artech House Publishers; ISBN: 1580533426.

Rosario Gennaro, Pankaj Rohatgi; *How to Sign Digital Streams*; Feb. 1998; 20 pages.

A. Perrig, R. Canetti,, Willock; *TESLA: Multicast source Authentication Transform Specification*; Oct. 2002; 14 pages; Internet Engineering Task Force.

Chung Kei Wong, Simon S. Lam; *Digital Signatures for Flows and Multicasts*; Aug. 1999; pp. 502-513; vol. 7, No. 4; IEEE/ACM Transactions on Networking.

H. Krawczyk, M.Bellare, R. Canetti; *HMAC: Keyed-Hashing for Message Authentication*; Feb. 1997; 11 pages; Network Working Group, Request for Comments: 2104.

M. Baugher, B. Weis, T. Hardjono, H. Harney; *The Group Domain of Interpretation*; Jul. 2003; 45 pages; Network Working Group, Request for Comments: 3547; The Internet Society (2003).

Mark Baugher, Ran Canetti, Pau-Chen Cheng, Pankj Rohatgi; *MESP: A Multicast Framework for the IPsec ESP*; Mar. 2003; 13 pages; Internet Engineering Task Force, MSEC Working Group.

Ralph C. Merkle; *A Certified Digital Signature*; Aug. 1989; pp. 218-238; Proceedings on Advances in Cryptology; Springer-Verlag, New York 1998; available at <http://dsns.csie.nctu.edu.tw/research/crupto/HTML/C89.HTM> (visited Dec. 30, 2004).

\* cited by examiner

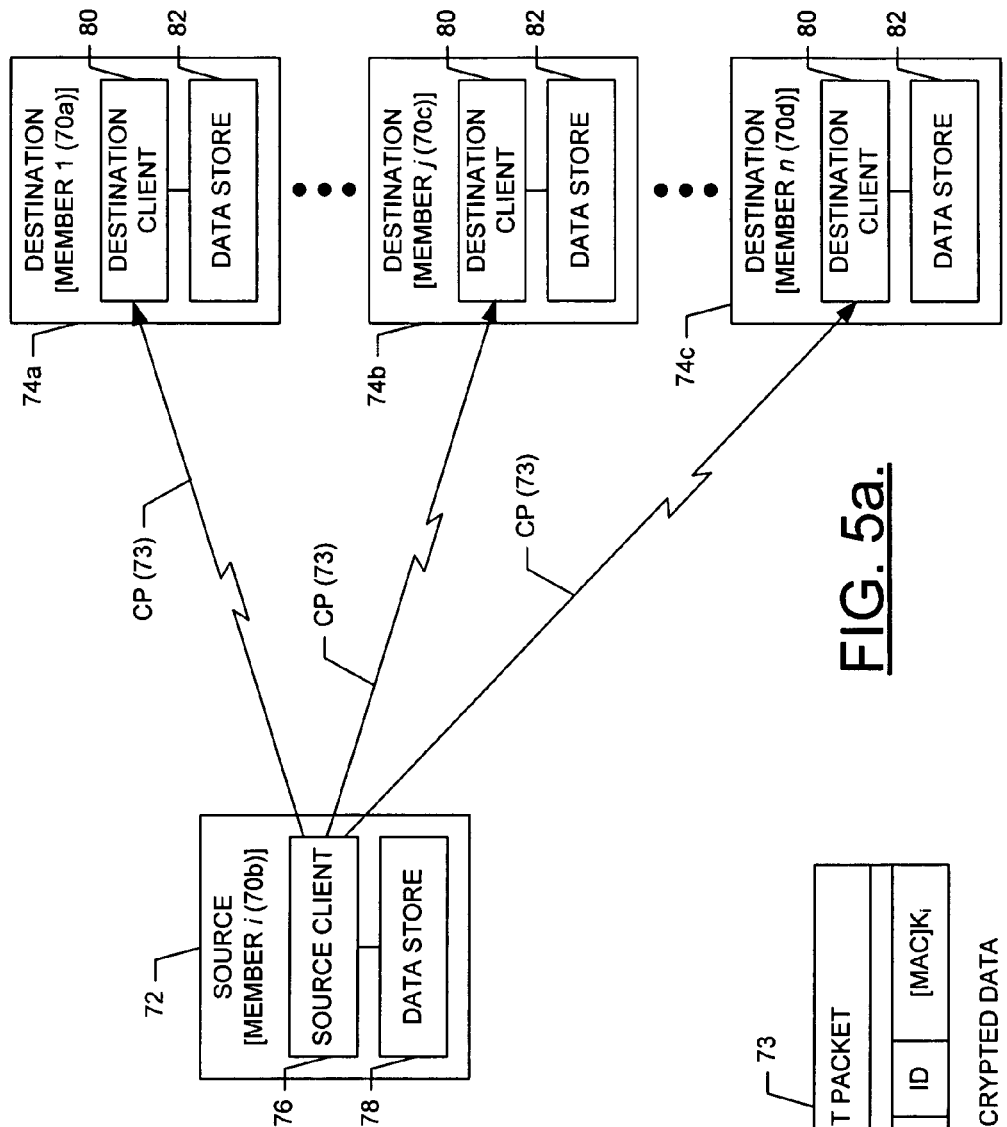
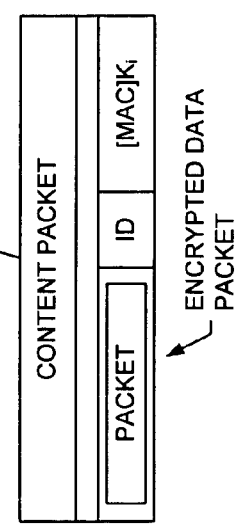
FIG. 5a.
FIG. 5b.

SYSTEM, METHOD AND COMPUTER PROGRAM PRODUCT FOR DETECTING A ROGUE MEMBER IN A MULTICAST GROUP

FIELD OF THE INVENTION

The present invention generally relates to systems and methods of providing multicast security and, more particularly, relates to systems and methods of providing data source authentication in multicast security.

BACKGROUND OF THE INVENTION

Multimedia streaming is considered to be a major evolving Internet application since it aims at replacing widely known television applications such as video-on-demand, pay-per-view, or video broadcast. Currently, a number of portal sites offer Internet protocol (IP) multicast services to be extended to the communication of such services to wireless terminals. With such a service, a wireless system broadcasts data packets to a plurality of wireless terminals. Each wireless terminal receives and processes the same stream of packets. An example of a multicast service is IP multicast streaming for news and entertainment content in audio and video formats. In other types of services, multiple sources broadcast data packets to a plurality of wireless terminals. An example of this type of service is multiparty multimedia conferencing whereby a plurality of wireless terminals multicast data packets to one another during a conferencing session. As will be appreciated, multicast communication is typically more spectrum efficient than unicast communication since multicast communication services are amenable to broadcasting to a group of wireless terminals. Because frequency spectrum for wireless services is very limited and very expensive to expand, the utilization of multicast services is very appealing to wireless service providers.

With an increase in the use of multicast communication, providing security for such communication also increases. Generally, multicast security has a number of goals, including for example, securing multicast communication for the multicast group (e.g., encryption), integrity protection, and providing an automated exchange and management of keying material for the multicast group. In addition, multicast security often attempts to deploy one or more security policies for multicast communications within the multicast group.

Multicast security also typically desires to provide data source authentication, often in addition to securing multicast communication for the multicast group. As will be appreciated, a source of data is often automatically authenticated in the case of in point-to-point communications. This is particularly the case when such point-to-point communications are symmetric key secured since only the source and destination possess the symmetric keys necessary to decrypt and/or authenticate the transmitted content. In contrast, in many conventional multicast security techniques, all of the members of a multicast group possess a symmetric key common to the group members. In such an instance, the source of data can typically only be identified as being a member of the multicast group, without identifying the particular group member.

One conventional technique for authenticating the data source in multicast communications is to digitally sign each data packet transmitted from the source to the members of the multicast group. Digital signatures provide non-repudiation on top of data source authentication and integrity protection. However, digital signatures also typically utilize public-key cryptography, which can be significantly slower to implement than symmetric key cryptography message authentication codes (MACs). Digital signatures also often require more data space overhead than MACs.

In an effort to alleviate the overhead associated with digital signatures, techniques have been developed whereby digital signatures are amortized over a number of packets. Examples of such techniques are star/hashing techniques, and different variations of hash chaining. Whereas such amortization techniques do reduce the overhead associated with digital signatures, such techniques also typically increase the communication costs, and often require the source and destinations to buffer data. In addition, various techniques such as that provided by the Timed Efficient Stream Loss-Tolerant Authentication (TESLA) protocol and its variations can require a form of time synchronization between the source and destinations, further complicating the source authentication procedure.

A more recently developed technique is disclosed by U.S. patent application Ser. No. 10/867,150, entitled: System, Method and Computer Program Product for Authenticating a Data Source in Multicast Communications, filed Jun. 14, 2004, the contents of which are hereby incorporated by reference in its entirety. In accordance with this more recently developed technique, a multicast group includes a source member that multicasts data packets, and a plurality of destination members that receive the data packets, where each member of the multicast group is associated with a symmetric key that is known to each other member of the multicast group.

In operation, the source member is capable of generating a code for a data packet using a symmetric key associated with the source member and thereafter multicasting the data packet and the code. Each of the destination members, then, is capable of receiving the data packet and the code. The destination member can then multicast a recall packet to the members of the multicast group when the destination member determines that the source member claims an identity of the respective destination member (i.e., spoofs the identity of the respective destination member), the source member in this instance operating as a rogue member of the multicast group. Otherwise, the destination member is capable of authenticating the source member based upon the code.

A technique for authenticating a source in multicast communications such as that disclosed by the '150 application overcomes the drawbacks of the other aforementioned techniques. In this regard, the technique of the '150 application permits the destination members to authenticate a source member without requiring digital signatures or time synchronization between the source and destinations in point-to-multipoint, multicast communication. As will be readily appreciated by those skilled in the art, however, it is generally desirable to further improve upon existing techniques, including that of the '150 application.

SUMMARY OF THE INVENTION

In light of the foregoing background, embodiments of the present invention provide a further improved system, method and computer program product for multicasting data packets and authenticating the source of the data packets. In accordance with embodiments of the present invention, within a multicast group, destination members are capable of authenticating the source member of multicast communications, such as in accordance with the technique of the '150 application. In addition, further in accordance with embodiments of the present invention, a rogue member claiming the identity of another, spoofed group member in multicast communications is capable of being identified. By identifying the rogue member, the rogue member can be isolated or otherwise removed from the multicast group to prevent that rogue member from continuing to spoof the identity of another multicast group member.

According to one aspect of the present invention, a system is provided for multicasting a data packet in a multicast group. The system includes a network entity, such as a group controller/key server (GCKS), and a plurality of members of the multicast group. At least one member is capable of notifying the network entity of a member of the group operating as a rogue member claiming an identity of another member of the group, that other member being a spoofed member. In response to being notified, the network entity can distribute, to at least the members of the group other than the spoofed member, different versions of a symmetric key associated with the spoofed member. Additionally, the network entity can be configured to distribute, to the spoofed member, all of the different versions of a symmetric key associated with the spoofed member.

After the network entity distributes the sets of symmetric keys, the member notifying the network entity of the rogue member can receive a next data packet and a code for the next data packet, the code having been generated at the rogue member using a version of the symmetric key associated with the spoofed member. By distributing different versions of the symmetric key to different members of the multicast group, the rogue member can be identified based upon the version of the symmetric key, such as by a member of the group and/or the network entity. The network entity can then be capable of excluding the rogue member from the multicast group after the rogue member has been identified.

More particularly, the member notifying the network entity of the rogue member can be capable of receiving a data packet and determining if the received data packet has been multicast from a member of the group operating as a rogue member. For example, the respective member can be capable of receiving a content packet including the data packet, a code for the data packet, and a member identifier. The respective member can then be capable of determining if the received data packet has been multicast from a rogue member by comparing the member identifier in the content packet and a member identifier associated with the member receiving the content packet. In such an instance, the respective member can determine that the received data packet has been multicast from a rogue member when the comparison identifies a match of the member identifier in the content packet to the member identifier associated with the member receiving the content packet. Irrespective of how the respective member determines that the received data packet has been multicast from the rogue member, the respective member can thereafter be capable of notifying the network entity in response to such a determination.

In a further aspect of the present invention, one or more members are also capable of authenticating other members of the group. In such an instance, at least one member of the multicast group can be capable of operating as a destination member to receive a data packet and a code for the data packet from another member of the group operating as a source member, where the code has been generated at the source member using a symmetric key associated with the source member. A destination member can then determine if the received data packet has been multicast from a member of the group operating as a rogue member. If the received data packet has been multicast from a rogue member, the destination member can multicast a recall packet to the members of the multicast group. Otherwise, the destination member can authenticate the source member based upon the code associated with the data packet. As before, however, when, and in response to determining that, the received data packet has been multicast from the rogue member, the destination member can also notify the network entity of the presence of the rogue member.

According to other aspects of the present invention, a member of a multicast group, a method and a computer program product are provided. Embodiments of the present invention therefore provide an improved system, group member, method and computer program product for multicasting data packets and identifying a rogue member in a multicast group. In a manner similar to that disclosed by the '150 application, members of the multicast group can authenticate a member multicasting data packets based upon a code generated using the data packet and a symmetric key associated with the source member. Also similar to the manner disclosed by the '150 application, the members can also be configured to multicast a "recall" packet to the multicast group when the member receives a data packet from a rogue member, the data packet purported to be from itself, which the member did not multicast to the group. In accordance with embodiments of the present invention, however, one or more of the members can further identify the rogue member such that the rogue member can thereafter be excluded from the multicast group. As such, the system, group member, method and computer program product of embodiments of the present invention solve the problems identified by prior techniques and provide additional advantages.

BRIEF DESCRIPTION OF THE DRAWINGS

Figure 1:
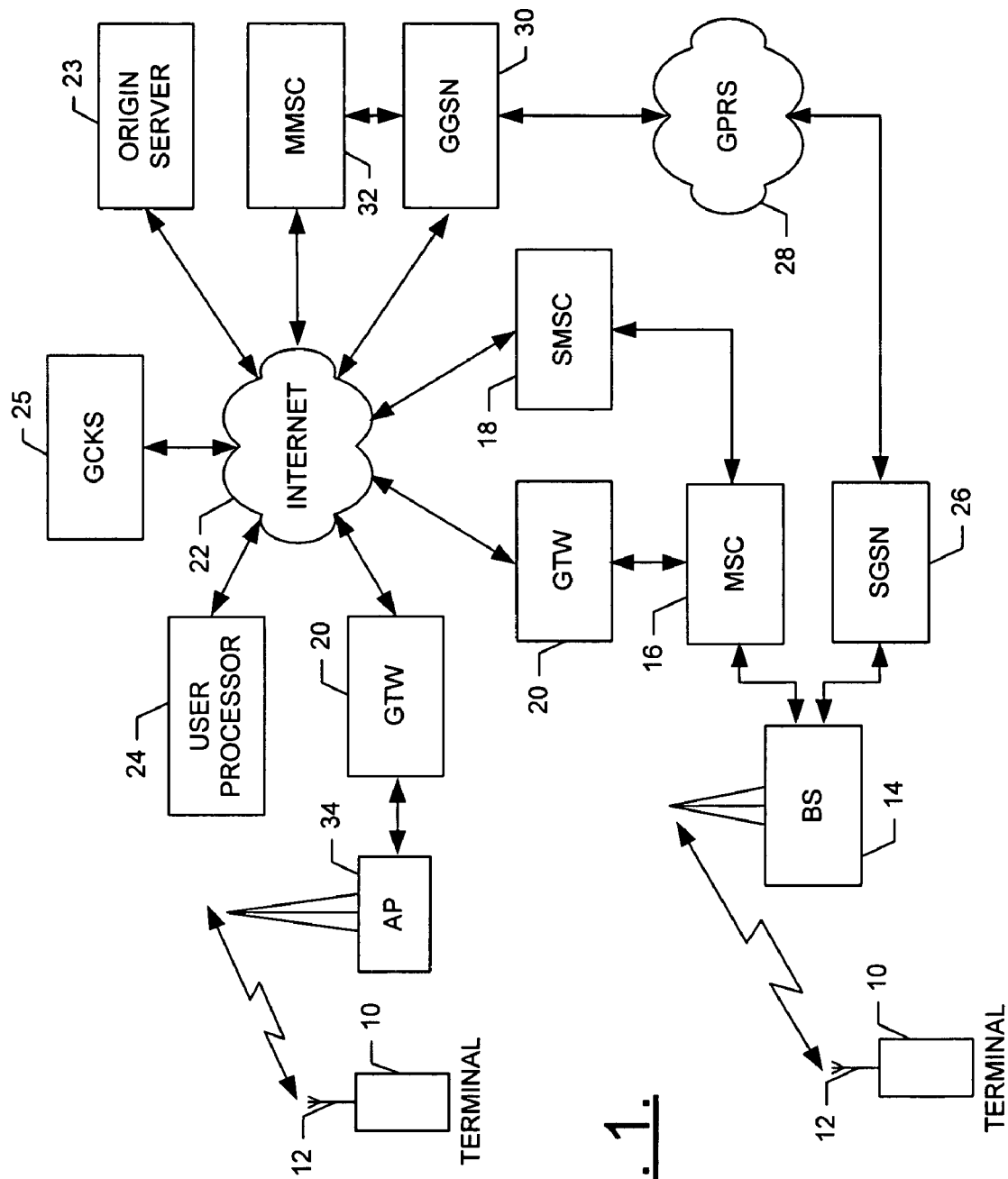
Figure 2:
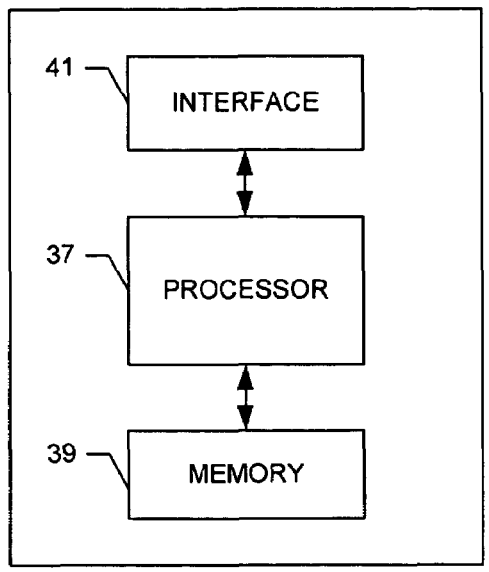
Figure 3:
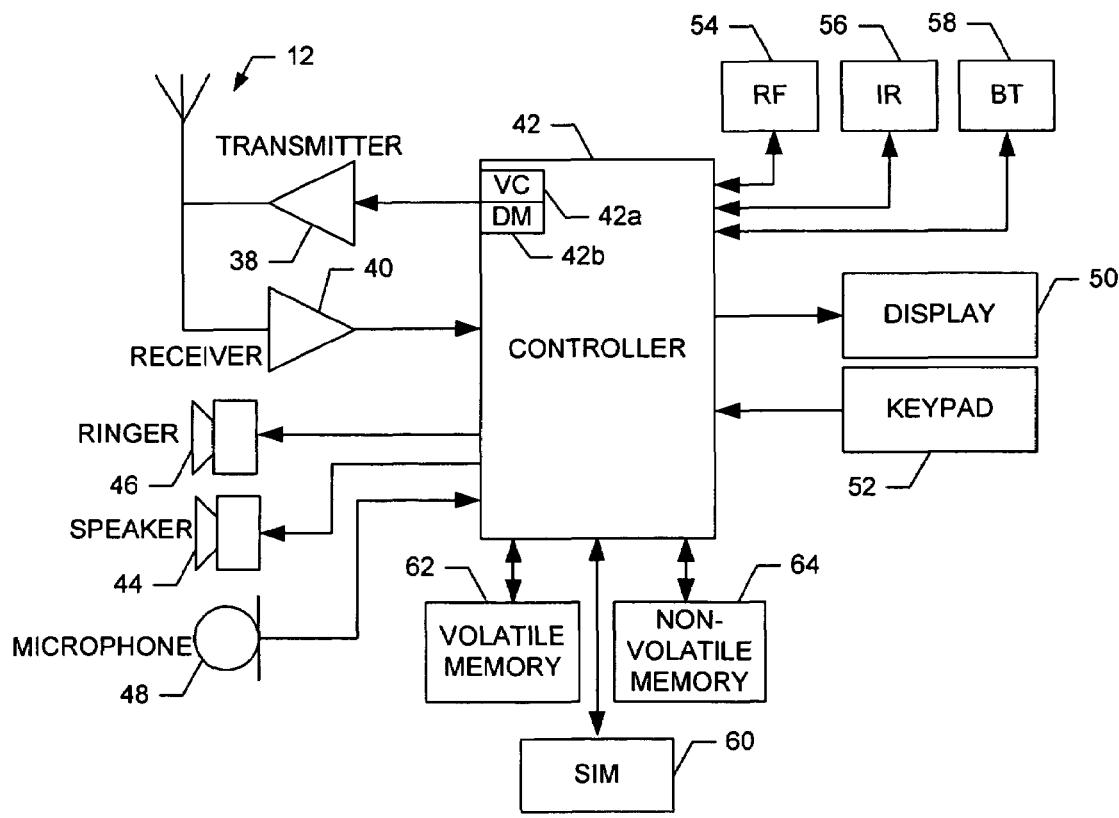
Figure 4:
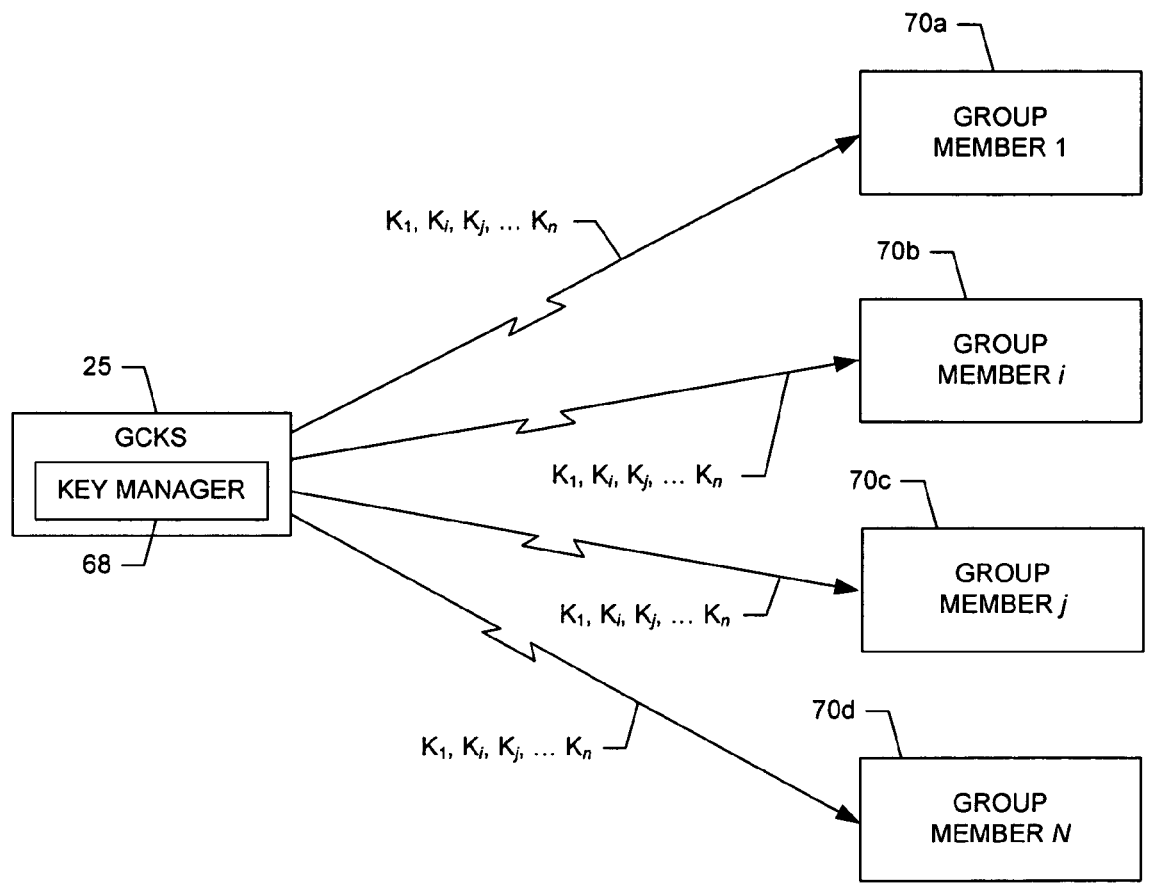
Figure 6A:
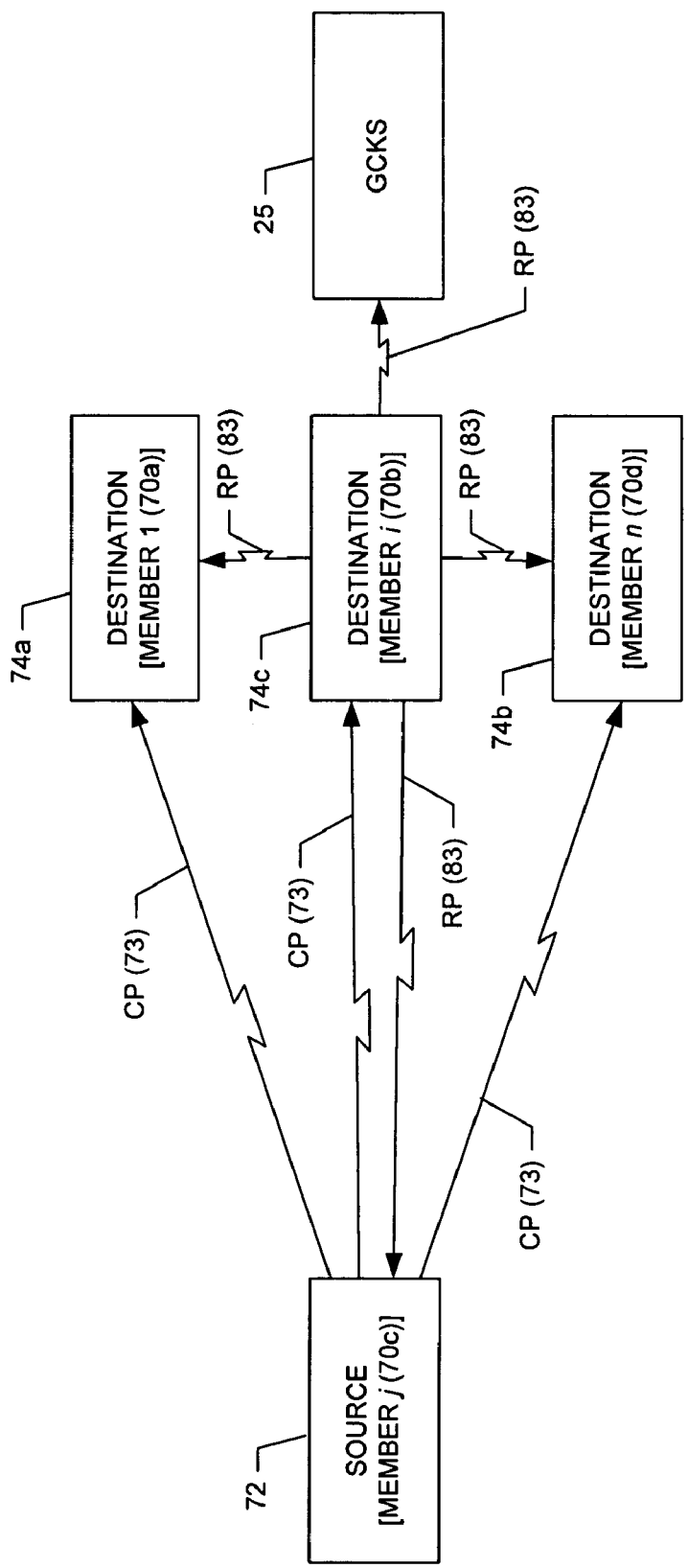
Figure 6B:
Figure 7:
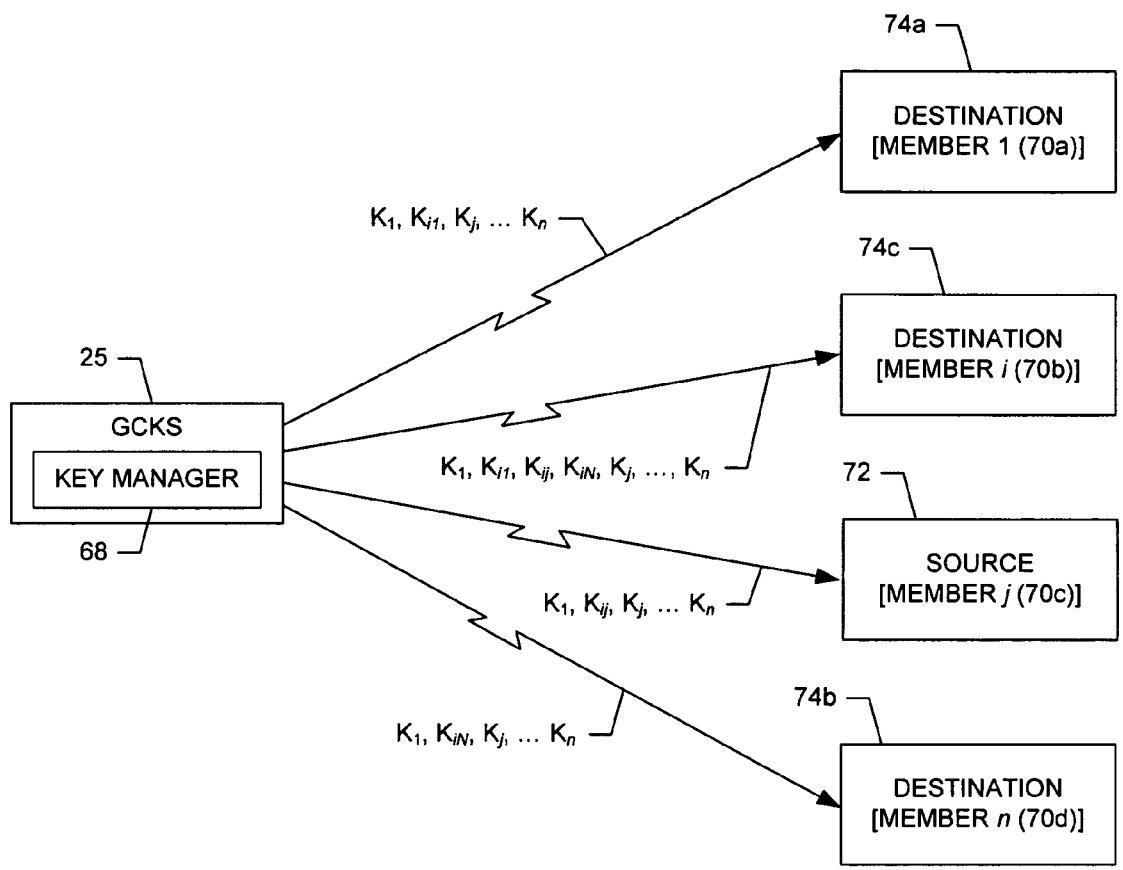
Figure 8A:
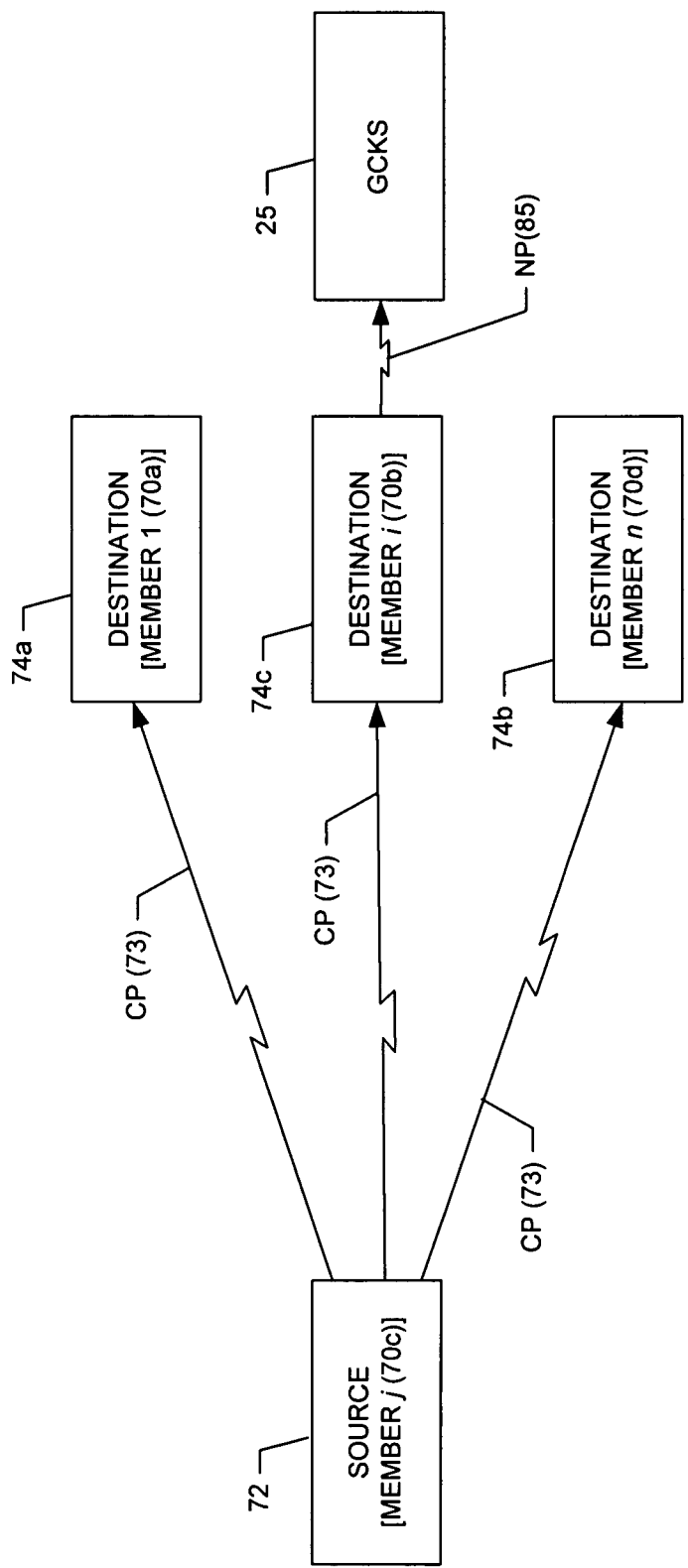
Figure 8B:
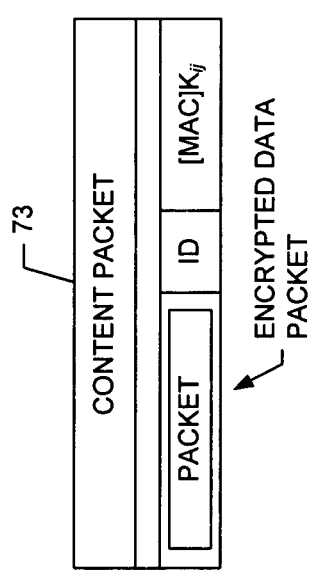
Figure 9:
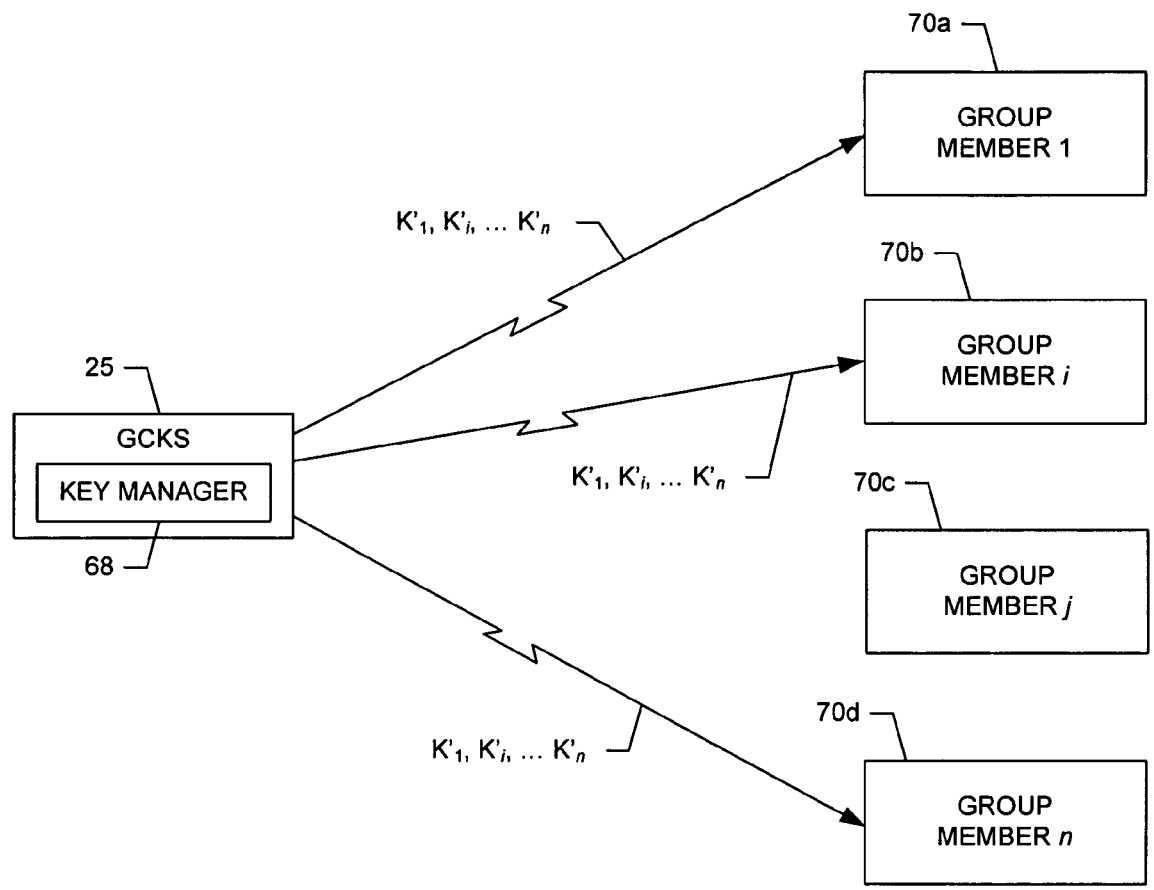

Having thus described the invention in general terms, reference will now be made to the accompanying drawings, which are not necessarily drawn to scale, and wherein:

FIG. 1 is a block diagram of one type of terminal and system that would benefit from embodiments of the present invention;

FIG. 2 is a schematic block diagram of an entity capable of operating as a terminal, origin server, user processor and/or group controller/key server, in accordance with embodiments of the present invention;

FIG. 3 is a schematic block diagram of a terminal, in accordance with one embodiment of the present invention;

FIG. 4 is a functional block diagram of a group controller/key server distributing symmetric keys to members of a multicast group, in accordance with one embodiment of the present invention;

FIG. 5a is a functional block diagram of a source member multicasting a content packet to destination members of a multicast group, in accordance with one embodiment of the present invention;

FIG. 5b is a schematic illustration of an example content packet multicast in an instance such as that shown in FIG. 5a, in accordance with one embodiment of the present invention;

FIG. 6a is a functional block diagram of a rogue member multicasting a content packet to destination members, and a destination member multicasting a recall packet to other members of a multicast group in response to the destination member receiving a content packet from the rogue member, in accordance with one embodiment of the present invention;

FIG. 6b is a schematic illustration of an example recall packet multicast in an instance such as that shown in FIG. 6a, in accordance with one embodiment of the present invention;

FIG. 7 is a functional block diagram of a group controller/key server (GCKS) re-keying members of the group in response to being notified of a rogue member, in accordance with one embodiment of the present invention;

FIG. 8a is a functional block diagram of the rogue member of FIG. 6a multicasting a subsequent content packet to destination members after the GCKS re-keys members of the group shown in FIG. 7, the rogue member being identified based upon the content packet, in accordance with one embodiment of the present invention;

FIG. 8b is a schematic illustration of an example content packet multicast in an instance such as that shown in FIG. 8a, in accordance with one embodiment of the present invention;

FIG. 9 is a functional block diagram of the GCKS again re-keying members of the group, excluding the identified rogue member, in accordance with one embodiment of the present invention; and FIGS. 10 and 11a-11f are flowcharts including various steps in a method of authenticating a source member in a multicast group, and identifying a rogue member in such a group, in accordance with one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, the system can include a terminal 10 that may have an antenna 12 for transmitting signals to and for receiving signals from a base site or base station (BS) 14. The base station is a part of one or more cellular or mobile networks that each include elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also control the forwarding of messages for the terminal to and from a messaging center, such as short messaging service (SMS) messages to and from a SMS center (SMSC) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a gateway (GTW) 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with one or more origin servers 23, user processors 24, group controllers/key servers (GCKSs) 25 or the like, one of each being illustrated in FIG. 1 and described below.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 20. Also, the GGSN can be coupled to a messaging center, such as a multimedia messaging service (MMS) center 32. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

By coupling the SGSN 26 to the GPRS core network 28 and the GGSN 30, devices such as service providers can be coupled to the terminal 10 via the Internet 22, SGSN and GGSN. In this regard, devices such as service providers can communicate with the terminal across the SGSN, GPRS and GGSN. In addition, by coupling the SGSN 26 to the GPRS core network 28 and the GGSN 30, devices such as an origin server 23, user processor 24 and/or GCKS 25 can be coupled to the terminal 10 via the Internet 22, SGSN and GGSN. In this regard, devices such as an origin server, user processor and/or GCKS can communicate with the terminal across the SGSN, GPRS and GGSN. By directly or indirectly connecting the terminals and the other devices (e.g., origin server, user processor, etc.) to the Internet, the terminals and other devices can communicate with one another, such as in accordance with a multicast communication technique like the Multimedia Broadcast Multicast Service (MBMS). For more information on the MBMS, see Third Generation Partnership Project (3GPP) technical specification 3GPP TS 22.146, entitled: *Multimedia Broadcast Multicast Service(MBMS)*, the contents of which are hereby incorporated by reference in its entirety.

Although not every element of every possible network is shown and described herein, it should be appreciated that the terminal 10 can be coupled to one or more of any of a number of different networks. In this regard, mobile network(s) can be capable of supporting communication in accordance with any one or more of a number of first-generation (1G), second-generation (2G), 2.5G and/or third-generation (3G) mobile communication protocols or the like. Additionally or alternatively, mobile network(s) can be capable of supporting communication in accordance with any one or more of a number of different digital broadcast networks, such as Digital Video Broadcasting (DVB) networks including DVB-T (DVB-Terrestrial) and/or DVB-H (DVB-Handheld), Integrated Services Digital Broadcasting (ISDB) networks including ISDB-T (ISDB-Terrestrial), or the like.

More particularly, for example, the terminal 10 can be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrowband AMPS (NAMPS), as well as TACS, network(s) may also benefit from embodiments of the present invention, as should dual or higher mode terminals (e.g., digital/analog or TDMA/CDMA/analog phones).

The terminal 10 can further be coupled to one or more wireless access points (APs) 34. The APs can be configured to communicate with the terminal in accordance with techniques such as, for example, radio frequency (RF), Bluetooth (BT), infrared (IrDA) or any of a number of different wireless networking techniques, including WLAN techniques. The APs 34 may be coupled to the Internet 22. Like with the MSC 16, the APs can be directly coupled to the Internet. In one embodiment, however, the APs are indirectly coupled to the Internet via a GTW 20. As will be appreciated, by directly or indirectly connecting the terminals and the origin server 23, user processor 24, GCKS 25 and/or any of a number of other devices, to the Internet, the terminals can communicate with one another, the user processor, etc., to thereby carry out various functions of the terminal, such as to transmit data, content or the like to, and/or receive content, data or the like from, the user processor. As used herein, the terms "data," "content,"

"information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 1, in addition to or in lieu of coupling the terminal 10 to user processors 24 across the Internet 22, the terminal and user processor can be coupled to one another and communicate in accordance with, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal.

Referring now to FIG. 2, a block diagram of an entity capable of operating as a terminal 10, origin server 23, user processor 24 and/or GCKS, is shown in accordance with one embodiment of the present invention. Although shown as separate entities, in some embodiments, one or more entities may support one or more of a terminal, origin server and/or user processor, logically separated but co-located within the entit(ies). For example, a single entity may support a logically separate, but co-located, terminal and origin server. Also, for example, a single entity may support a logically separate, but co-located terminal and user processor.

As shown, the entity capable of operating as a terminal 10, origin server 23, user processor 24 and/or GCKS 25 can generally include a processor 37 connected to a memory 39. The processor can also be connected to at least one interface 41 or other means for transmitting and/or receiving data, content or the like. The memory can comprise volatile and/or non-volatile memory, and typically stores content, data or the like. For example, the memory typically stores content transmitted from, and/or received by, the entity. Also for example, the memory typically stores software applications, instructions or the like for the processor to perform steps associated with operation of the entity in accordance with embodiments of the present invention. When the entity comprises a GCKS, for example, the memory can store a key manager capable of generating or otherwise providing, to each member of a multicast group of entities, a symmetric key associated with the respective member, as well as a symmetric key associated with each of the other members of the multicast group. In this regard, when the entity functions as a member of a multicast group of entities, the memory can store the symmetric keys provided by the GCKS. In addition, the memory can store a symmetric key common to all members of the multicast group. Further, the memory can store a public/private key pair associated with the respective entity.

Reference is now made to FIG. 3, which illustrates one type of terminal 10 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the terminal 10 can include a transmitter 38, receiver 40, and controller 42 or other processor that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of first generation (1G), second generation (2G), 2.5G and/or third-generation (3G) communication protocols or the like. For example, the terminal may be capable of operating in accordance with 2G wireless communication protocols IS-136 (TDMA), GSM, and IS-95 (CDMA). Also, for example, the terminal may be capable of operating in accordance with 2.5G wireless communication protocols GPRS, Enhanced Data GSM Environment (EDGE), or the like. Further, for example, the terminal may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 42 includes the circuitry required for implementing the audio and logic functions of the terminal 10. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC) 42a, and may include an internal data modem (DM) 42b. Further, the controller may include the functionally to operate one or more software programs, which may be stored in memory (described below). For example, the controller may be capable of operating a connectivity program, such as a conventional Web browser. The connectivity program may then allow the terminal to transmit and receive Web content, such as according to HTTP and/or the Wireless Application Protocol (WAP), for example.

The terminal 10 also comprises a user interface including a conventional earphone or speaker 44, a ringer 46, a microphone 48, a display 50, and a user input interface, all of which are coupled to the controller 42. The user input interface, which allows the terminal to receive data, can comprise any of a number of devices allowing the terminal to receive data, such as a keypad 52, a touch display (not shown) or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 10 can also include one or more means for sharing and/or obtaining data. For example, the terminal can include a short-range radio frequency (RF) transceiver or interrogator 54 so that data can be shared with and/or obtained from electronic devices in accordance with RF techniques. The terminal can additionally, or alternatively, include other short-range transceivers, such as, for example an infrared (IR) transceiver 56, and/or a Bluetooth (BT) transceiver 58 operating using Bluetooth brand wireless technology developed by the Bluetooth Special Interest Group. The terminal can therefore additionally or alternatively be capable of transmitting data to and/or receiving data from electronic devices in accordance with such techniques. Although not shown, the terminal can additionally or alternatively be capable of transmitting and/or receiving data from electronic devices according to a number of different wireless networking techniques, including WLAN techniques such as IEEE 802.11 techniques or the like.

The terminal 10 can further include memory, such as a subscriber identity module (SIM) 60, a removable user identity module (R-UIM) or the like, which typically stores information elements related to a mobile subscriber. In addition to the SIM, the terminal can include other removable and/or fixed memory. In this regard, the terminal can include volatile memory 62, such as volatile Random Access Memory (RAM) including a cache area for the temporary storage of data. The terminal can also include other non-volatile memory 64, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Internet Protocol (IP) address, Session Initiation Protocol (SIP) address or the like, capable of uniquely identifying the terminal, such as to the MSC 16.

As explained in the background section, a more recently developed technique for authenticating a member of a multicast group is disclosed by U.S. patent application Ser. No. 10/867,150, entitled: System, Method and Computer Program Product for Authenticating a Data Source in Multicast Communications, filed Jun. 14, 2004. In such a technique, the source member multicasting data packets is capable of generating a code for a data packet using a symmetric key associated with the source member and thereafter multicasting the data packet and the code. After receiving the data packet and code, a destination member can then authenticate the source member, or determine that the source member is a rogue member of the multicast group, based upon the code. And as also explained in the background section, although the technique of the '150 application overcomes drawbacks of conventional techniques for authenticating the data source in multicast communications; it is generally desirable to further improve upon existing techniques.

Reference is now drawn to FIGS. 4-11, which more particularly illustrate embodiments of the present invention. As explained below with respect to FIGS. 4, 7 and 9, for example, a GCKS 25 is capable of operating a key manager 68 to distribute symmetric keys to members of a multicast group that includes N members, where member 1 70a, member i 70b, member j 70c, and member n 70d are shown. Briefly, as explained below, each member of a multicast group can be associated with a symmetric key K that is known to each other member of the multicast group. The key manager is capable of distributing symmetric keys to members of the multicast group at one or more instances, such as at regular or irregular intervals, where the symmetric key associated with one or more members may change from one instance to the next.

Also, as explained below with respect to FIGS. 5a, 6a and 8a, a source member 72 of the multicast group is capable of sending, multicasting or otherwise transferring one or more content packets (CP) 73 (see FIGS. 5b and 8b) each including one or more data packets, to a plurality of destination members 74 of the multicast group (three being shown as destination members 74a, 74b and 74c). The source member is capable of operating an application, such as a source client 76, which is capable of multicasting one or more data packets from a data store 78 in memory (e.g., memory 39) of the source, to the destination members. The destination members, in turn, are each capable of operating a destination client 80, which is capable of receiving the content packets and authenticating the source member based upon information in the content packets. Thereafter, if the source member is authenticated, the destination agents can be capable of storing the data packet(s) in a content storage 82 associated with the respective destination members.

As explained in greater detail below, in accordance with embodiments of the present invention, the destination clients 80 of the destination members 74 are capable of authenticating the source member 72 without requiring digital signatures or time synchronization between the source and destinations in point-to-multipoint, multicast communication. To permit the source member to multicast data packets to the destination members, and allow the destination members to authenticate the source member of the data packets, the source client 76 of the source member can generate a content packet 73 based upon the symmetric key associated with the source member, the content packet including the data packet. More particularly, the source client can generate a content packet including the data packet, the identity of the source member and a code generated with the symmetric key associated with the source member. And if so desired, the source client can encrypt the data packet and/or source member ID with its symmetric key or a group symmetric key.

The destination clients 80 of the destination members 74 can then authenticate the source member 72 based upon the content packet and the symmetric key associated with the source member. More particularly the destination clients can authenticate the source member by decrypting and authenticating the code with the symmetric key of the source member. Then, if the identity of the source member is authenticated, the destination clients can decrypt the data packet with the source symmetric key or group symmetric key (which ever used to encrypt the data packet), and thereafter store the decrypted data packets in data stores 82. By utilizing the symmetric key associated with the source member, and authenticating the source member based upon its symmetric key, the destination clients of embodiments of the present invention are capable of authenticating the source member against communications outside the multicast group.

As will be appreciated, however, since every member of the multicast group knows the symmetric key of every other member of the group, a rogue member of the group can be capable of multicasting data packets using the symmetric key and identity of another member of the group, thus spoofing or claiming the identity of another member of the group. As such, to deter members of the group from operating as rogue members, each member of the multicast group can be configured to multicast a "recall" packet (RP) 83 to the multicast group when the member receives a data packet purported to be from itself, which the member did not multicast to the group (presuming, e.g., that the member has knowledge of data packets it multicasts or otherwise does not receive data packets it multicast), as shown in FIG. 6a. Then, the destination clients 80 of the destination members 74 that received the content packet from the spoofing member can also receive the recall packet and determine, from the recall packet, that the previously received content packet was not, in fact, sent from the member identified by the content packet. The destination clients can thereafter treat the previously received content packet as though the source member that multicasted the content packet (i.e., the spoofing group member) were not authenticated.

To further identify the rogue member spoofing or claiming the identity of another member of the group, the destination client 80 of the spoofed destination member 74 can also be configured to notify the GCKS 25 of the presence of a rogue member within the multicast group in response to receiving a data packet purported to be from itself. Then, in response to receiving the notification, the key manager 68 can, as before, distribute symmetric keys to members of the multicast group. In contrast to previous key distributions, however, the key manager can distribute, to the members of the group other than the spoofed member, different versions of the symmetric key associated with the spoofed member, as shown in FIG. 7. That is, the key manager can distribute, to each member of the group other than the spoofed member, a different version of the symmetric key associated with the spoofed member. Then, at the next instance of the rogue member multicasting a content packet 73 purported to be from the spoofed member, the destination members may fail to authenticate the rogue member since the version of the spoofed member's symmetric key used to generate the content packet differs from the version of the spoofed member's symmetric key known to the other members of the group, as shown in FIG. 8a. And since each member received a different version of the symmetric key, the rogue member can be identified based upon the version of the symmetric key used to generate the content packet. Thereafter, the identified rogue member can be removed from the multicast group, such as by again re-keying the members of the group, but excluding the rogue member such that the rogue member no longer has an associated symmetric key or knowledge of the symmetric keys of other members of the group, as shown in FIG. 9.

As shown and described herein, the key manager 68, source client 76 and destination client 80 each comprise software operated by the GCKS 25, source member 72 and destination member 74, respectively. It should be understood, however, that the key manager, source client and/or destination client can alternatively comprise firmware or hardware, without departing from the spirit and scope of the present invention. Also, although the key manager, source client and destination client are shown and described as being local to the GCKS, source member and destination member, respectively, any one or more of the key manager, source client and destination client can alternatively be distributed from, and in communication with, the GCKS, source and destination, respectively, such as across the Internet 22. Further, as shown and described herein, content packets and other data, information or the like are sent or otherwise transferred between the GCKS, source member and/or destination members. It should be understood, however, that the terms "sending," "multicasting" and "transferring" can be used herein interchangeably, and that sending, multicasting or transferring data packets can include, for example, moving or copying content from the source member to the destination members, without departing from the spirit and scope of the present invention.

The system, method and computer program product of embodiments of the present invention will now be described in more detail with respect to a source member 72 sending, multicasting or otherwise transferring one or more data packets to a plurality of destination members 74. As described herein, the source and destination members are members of a multicast group and can each comprise any entity (e.g., terminal 10, origin server 23, user processor 24, GCKS 25, etc.) capable of multicasting and/or receiving data packets, content or the like in accordance with any of a number of different multicast communication techniques. Within a multicast group, a source member can comprise any group member functioning in accordance with embodiments of the present invention to multicast one or more data packets to a plurality of destination members. The destination members, on the other hand, can comprise any group members functioning in accordance with embodiments of the present invention to receive data packets from the source member and thereafter authenticate the source member. As will be further appreciated, although functionally operating in different manners, the same entity can, at different times, function as a GCKS, source member, destination member or one or more of a GCKS, source member and destination member.

Reference is now drawn to the flowcharts of FIGS. 10 and 11a-11f, which will be explained with reference to FIGS. 4-9 to describe various steps in a method of authenticating a source member in a multicast group, and identifying a rogue member in such a group, in accordance with one embodiment of the present invention. As shown in FIG. 4 and block 84 of FIG. 10, the method can include the GCKS 25, or more particularly the key manager 68 of the GCKS, keying the members 70a-70d of a multicast group by distributing a set of symmetric keys to each member, which the members can receive and store in respective data stores 82 (see FIG. 5a). The set of symmetric keys received by each member can include a symmetric key associated with the respective member, as well as a symmetric key associated with each of the other members of the group, shown as keys $K_1$, $K_i$, $K_j$ and $K_n$ for group member 1 70a, member i 70b, member j 70c and member n 70d, respectively. In addition, although not shown, the set of symmetric keys can also include a group symmetric key known to each member of the multicast group, such as a group traffic encryption key (GTEK).

The key manager 68 of the GCKS 25 can generate and distribute the symmetric keys to the multicast group members 70a-70d in any of a number of different manners. For example, the key manager can generate the symmetric keys from the same or different keying material, which may include an identifier or index of each member of the multicast group. The symmetric keys can then be distributed to the multicast group, such as in accordance with the Diffie-Hellman key agreement protocol, as such is well known to those skilled in the art.

As indicated above, the key manager 68 of the GCKS 25 can be configured to key the members 70a-70d of the multicast group at one or more instances, which may be at one or more regular or irregular intervals, or upon demand. Although the key manager can key the members in the same manner at each instance, however, one or more of the symmetric keys in the set of keys distributed at any given instance may differ from the respective keys distributed at the previous instance. Thus, by changing one or more of the keys distributed from one instance to the next, the key manager of embodiments of the present invention can provide better security than if the key manager only distributed the keys at a single instance, or distributed the same keys at each instance. In addition, by distributing the keys at a number of intervals, the key manager can also provide for the addition and subtraction of group members.

Figure 10:
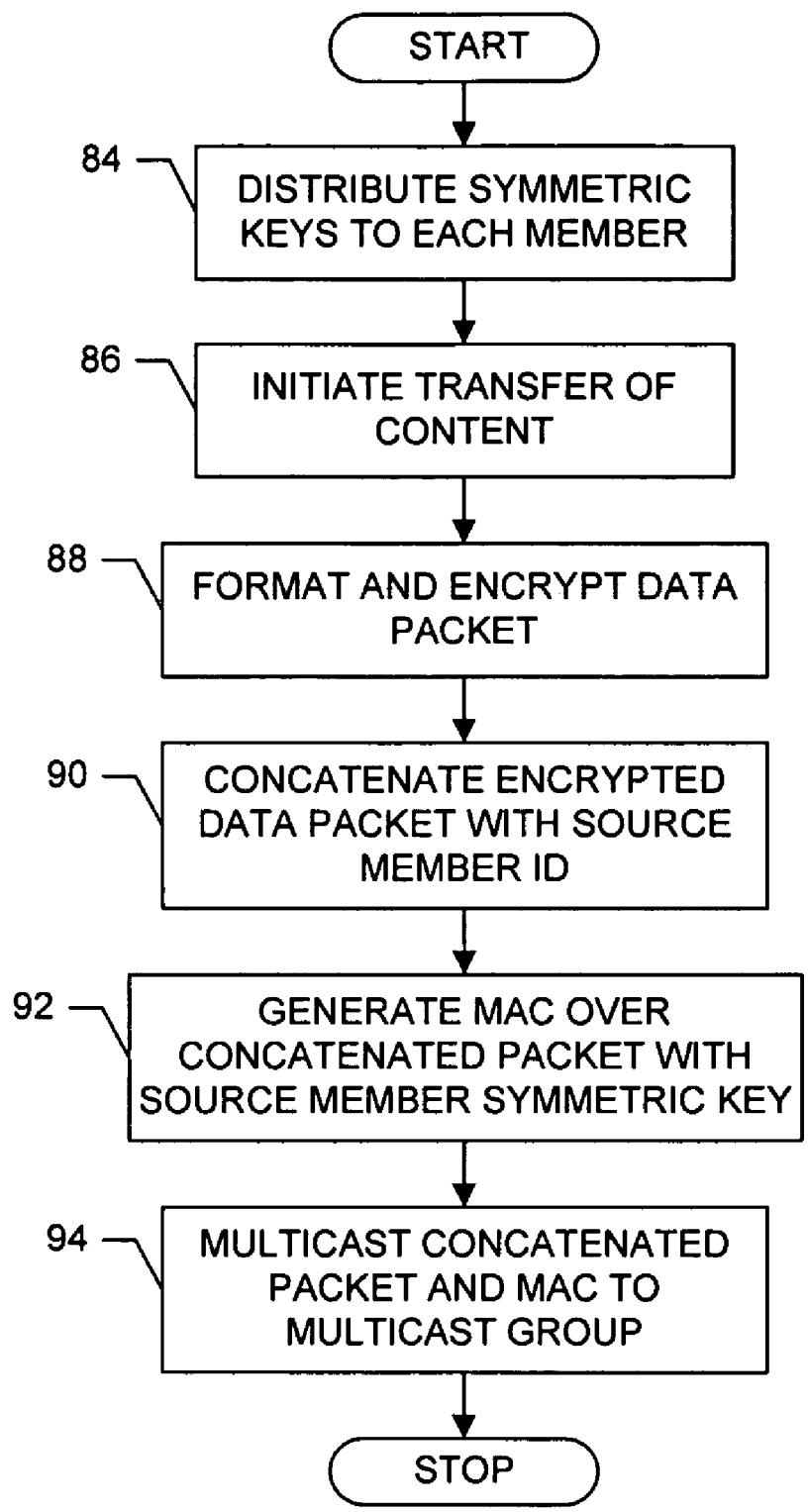

At any instance after keying or re-keying the members 70a-70d of the multicast group, the source client 76 of a source member 72 (e.g., member i 70b) can be initiated to transfer one or more pieces of content, as shown in FIG. 5a and block 86 of FIG. 10. After initiating the source client 78, the source client can format the content into one or more data packets. For example, the source client can format the content into an Ethernet frame, an Internet Protocol (IP) packet, a segment, a datagram or the like. Then, the source client can, but need not, encrypt the data packet, as shown in block 88. The source client can encrypt the data packet in accordance with any of a number of different techniques. In one embodiment, for example, the source client can encrypt the data packet in accordance with a multicast encapsulating security payload (MESP) technique. In this regard, in accordance with one embodiment, the source client can encrypt the data packet with the group symmetric key (e.g., GTEK) known to each member of the multicast group.

After encrypting the data packet, the source client 76 of the source member 72 (e.g., member i 70b) can add or otherwise concatenate the encrypted data packet with an identifier (ID) capable of identifying the source member to other members of the multicast group, as shown in block 90. In this regard, each member 70a-70d of the multicast group can be associated with any of a number of different identifiers capable of identifying the member to other members of the group. For example, when the multicast members comprise mobile terminals 10, the member identifiers can comprise IMEI codes, IMSI codes, MSISDN codes, IP addresses, SIP addresses or the like.

Irrespective of the member identifier concatenated with the encrypted data packet, the source client 76 of the source member 76 (e.g., member i 70b) can thereafter generate a code using the concatenated packet and a symmetric key associated with the source member, as shown in block 92. As indicated above, each member 70a-70d of the multicast group can be associated with a symmetric key that is known to each other member of the multicast group. Thus, destination members can thereafter authenticate the source member based upon the code and the symmetric key associated with the source member.

The code generated by the source client 76 of the source member 72 (e.g., member i 70b) can comprise any of a number of different codes. In one typical embodiment, for example, the code comprises a message authentication code (MAC). The MAC can comprise, for example, a cryptographic checksum of the concatenated packet generated using the source member symmetric key. Alternatively, for example, the MAC can comprise a cryptographic checksum of a hash of the concatenated packet generated using the source member symmetric key. In such instances, although not shown, the concatenated packet can be hashed before generating the MAC such that the MAC is smaller than if generated without hashing the concatenated packet. Irrespective of how the source client generates the MAC, however, the source client can thereafter multicast a content packet 73 to a plurality of destination members 74 of the multicast group including the source member, as shown in block 94. The content packet multicast by the source member, then, including the concatenated packet and MAC (generated with the source member symmetric key). For an illustration of an exemplar content packet, see FIG. 5b (Ki representing the symmetric key of group member i operating as the source member to generate the MAC).

Referring now to FIGS. 11a-11f, a method of authenticating a source member 72 multicasting data packets to a multicast group including the source member and a plurality of destination members 74 is provided, as is a method of identifying a rogue member in the multicast group. As shown, the methods include each destination member receiving a content packet 73 including a concatenated packet comprising an encrypted data packet and source member identifier, and a MAC, as shown in block 96 of FIG. 11a. Thereafter, each destination member, or more particularly each destination client 80 of each destination member, can determine if the content packet originated from a rogue member spoofing or claiming the identity of the respective destination member based upon the source member identifier. More particularly, the destination client can determine if the source member identifier in the content packet matches the destination member identifier of the respective destination member (instead of the source member that actually sent the content packet), as shown in block 98.

For purposes of illustration, presume that group member j 70c is a rogue member spoofing the identity of group member i 70b, with group member j operating as the source member 72, as shown in FIG. 6a. In such an instance, the source client 76 of group member j generates a content packet 73 including, as again shown in FIG. 5b, a concatenated packet comprising an encrypted data packet and the member identifier of member i, as well as a MAC generated using the symmetric key associated with member i, i.e., $K_i$. Group member j then multicasts the content packet to the destination members 74 of the multicast group, including group member 1 70a, group member i 70b and group member n 70d. Upon receiving the content packet, the destination clients 80 of destination members 74a and 74b (i.e., group member 1 and group member n) both determine that the source member identifier in the content packet (i.e., identifier of member i) does not match their respective member identifiers. The destination client of destination member 74c (i.e., group member i), on the other hand, does identify a match between the source member identifier in the content packet and its respective member identifier, signifying that a rogue member is spoofing the identity of destination member 74c.

Figure 11A:
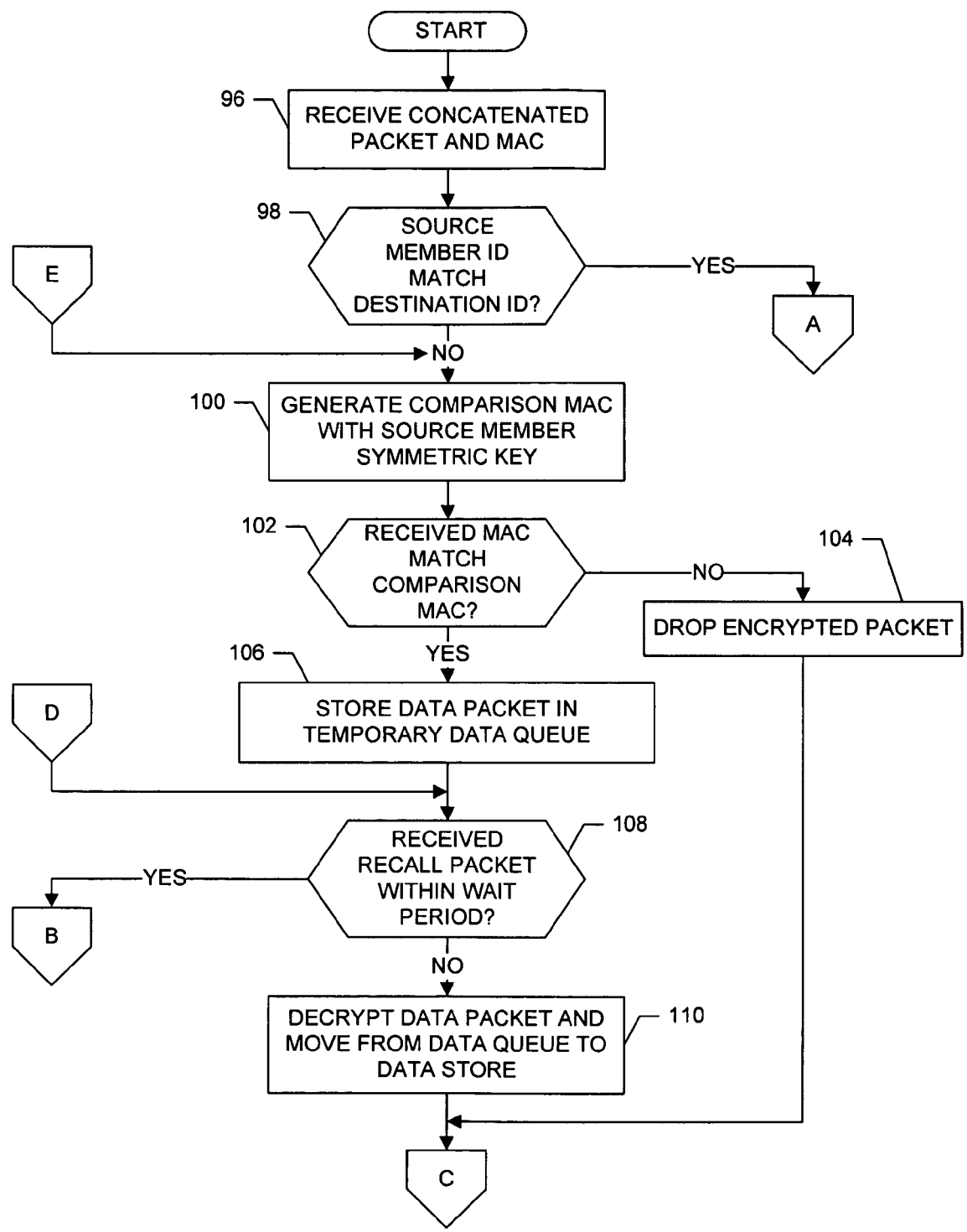
Figure 11B:
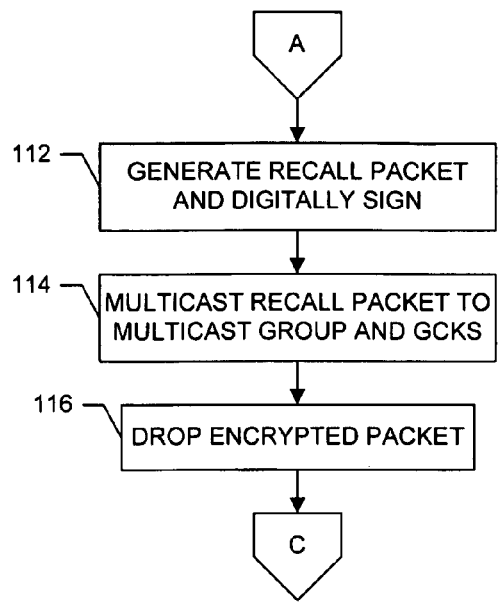

Thus, if a destination client 80 of a destination member 74 (e.g., group member i 70b) identifies a match between the source member identifier and the member identifier of the respective destination member, the destination client is capable of generating and multicasting a recall packet (RP) 83 to notify the other members of the multicast group (e.g., group member 170a, group member j and group member n 70d) that the source member 72 is a rogue member, the respective destination member not knowing at this point the identity of the rogue member, as shown in block 112 of FIG. 11b. In other terms, the destination client is capable of generating a recall packet to notify the members of the multicast group that the member identifier in the content packet is not associated with the source member that sent the content packet, but rather the destination member multicasting the recall packet.

The recall packet can include any of a number of different pieces of information such as, for example, a notification to the other members of the multicast group (e.g., group member 170a, group member j and group member n 70d). To decrease the likelihood of a destination member 74 successfully multicasting a recall packet in response to a content packet 73 properly sent from a source member 72, the destination client 80 of the respective destination member can digitally sign the recall packet, such as with a private key of a public/private key pair associated with the destination member, as also shown in block 112. In this regard, each member of the multicast group can also be associated with a public/private key pair, with the public key of the pair known to the other members of the multicast group as well as the GCKS 25. For an example of a digitally signed recall packet, see FIG. 6b.

After digitally signing the recall packet, the destination client 80 of the respective destination member 74 (e.g., group member i 70b) can multicast the digitally signed recall packet to the multicast group, including the other destination members 74 (e.g., group member 1 70a and group member n 70d) and the source member 72 (e.g., group member j 70c) originally multicasting the content packet 73 (now a destination member with respect to the recall packet), as shown in FIG. 6a and block 114 of FIG. 11b. Also, the destination client can notify the GCKS 25 of the presence of a rogue member within the multicast group, such as by also multicasting the digitally signed recall packet to the GCKS. Further, after identifying a match between the source member identifier and the respective destination member identifier, typically after multicasting the recall packet, the destination client can drop the encrypted packet since the destination client failed to authenticate the source member, as shown in block 116.

If a destination client 80 of a destination member 74 (e.g., group member 1 70a, group member n 70d) does not identify a match between the source member identifier (e.g., identifier of member i 70b) and the destination member identifier, the destination client can generate a comparison MAC using the symmetric key (e.g., $K_i$) associated with the source member identifier, such as in the same manner the source client 76 of the source member 72 (e.g., member j 70b) generated the MAC included within the content packet 73, as shown in block 100 of FIG. 11a. More particularly, for example, the destination client can generate the comparison MAC using the concatenated packet and the symmetric key associated with the group member identified by the source member identifier. In this regard, the respective symmetric key can be selected based upon the source member identifier, such as when the destination member stores the symmetric keys for the group members indexed by the group member identifiers. Alternatively, when the source client hashes the concatenated packet before generating the MAC, the destination client can hash the concatenated packet before generating the MAC, and thereafter generate the MAC from the hash.

As shown in block 102 after generating the comparison MAC, the destination client 80 of the destination member 74 (e.g., group member 1 70a, group member n 70d) can compare the comparison MAC with the MAC in the content packet 73. If the destination client does not identify a match, the source member (e.g., member j 70b) is not authenticated. In such instances, the destination client can drop the encrypted packet, and if so desired, can inform the source member that the destination failed to authenticate the source member, as shown in block 104. On the other hand, if the destination client does identify a match, the source member is authenticated, and the destination client can store the data packet in a temporary data queue within the data store 82 of the destination member, as shown in block 106. Before storing the data packet in the temporary data queue, however, the destination client can, if so desired, decrypt the data packet, such as in opposite manner that the source member encrypted the data packet (e.g., group symmetric key or source member symmetric key).

The destination client 80 of the destination member 74 (e.g., group member 1 70a, group member n 70d) can then maintain the data packet in the data queue for a wait period to allow the destination client of another destination member (e.g., member i 70b) to determine a match between the source member identifier and the respective destination member identifier, and if a match is identified, to multicast a digitally signed recall packet to the multicast group including the destination of the respective destination client, as explained above (see block 98 of FIG. 11a and blocks 112-116 of FIG. 11b). If the destination client does not receive a recall packet within the wait period, the destination client can decrypt the data packet (unless decrypted before storing in the temporary data queue), such as in opposite manner that the source member encrypted the data packet (e.g., group symmetric key or source member symmetric key), as shown in block 108 and 110. The destination client can then move the decrypted data packet from the data queue to another, more permanent location in the data store of the destination, as also shown in block 110.

Figure 11C:
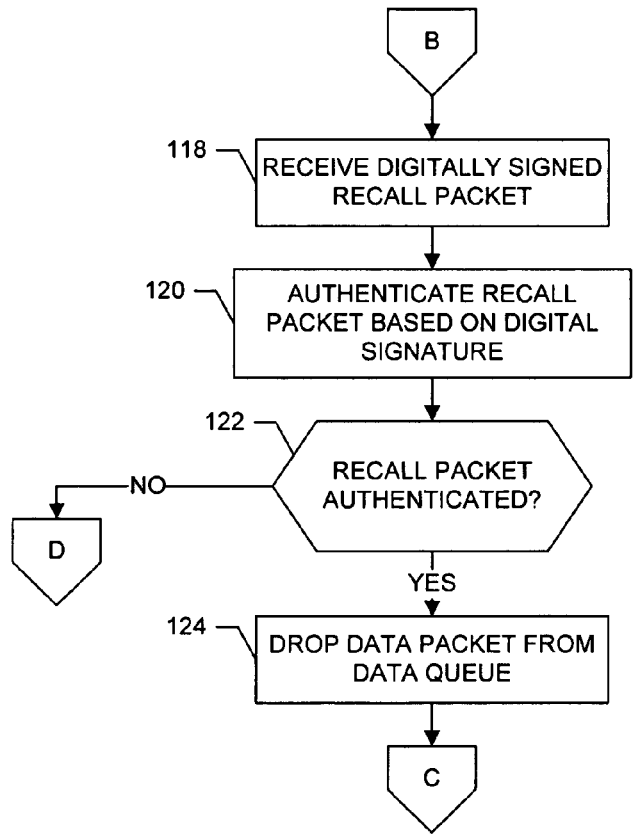
Figure 11D:
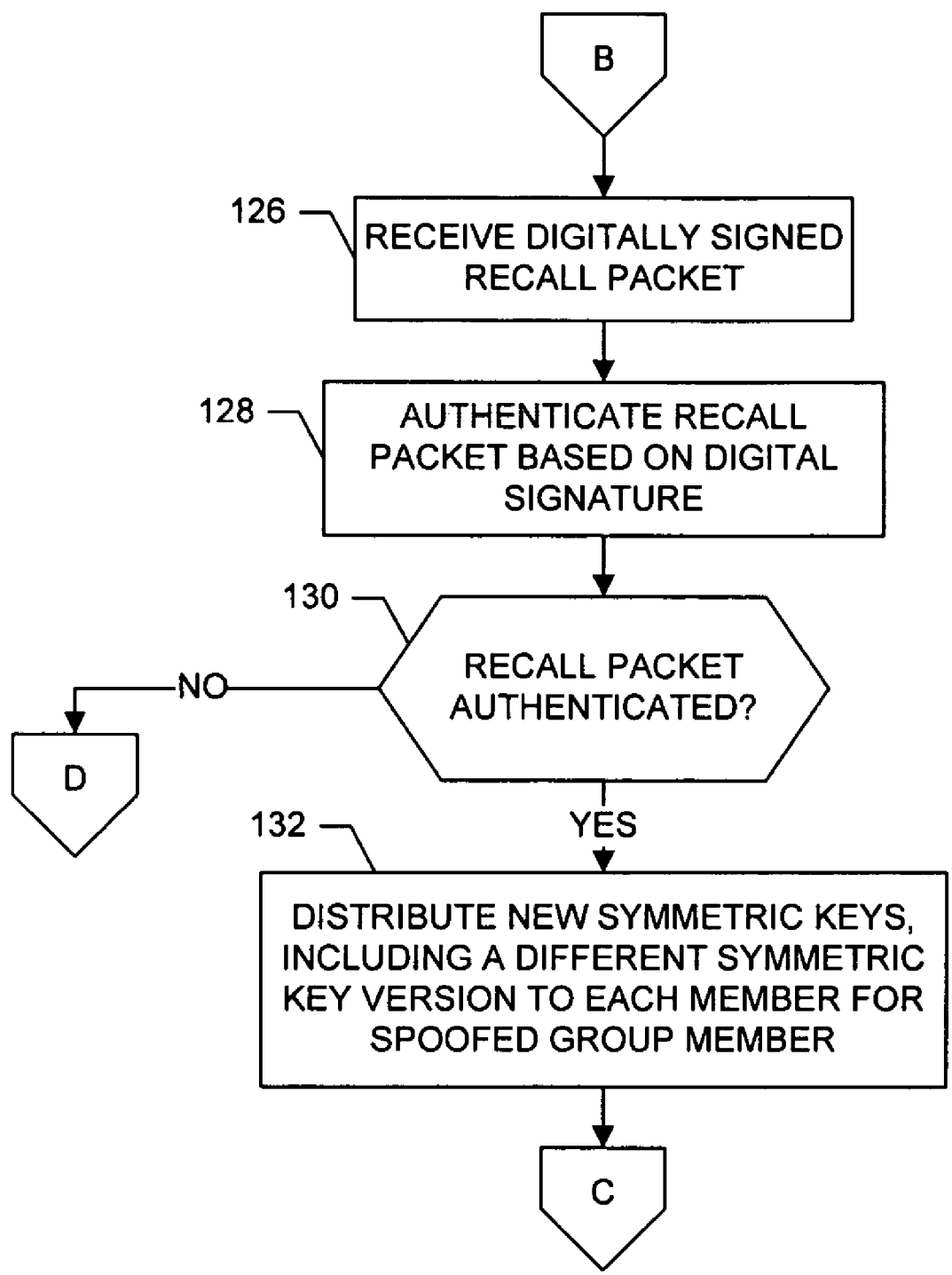

If the destination client 80 of the destination member 74 (e.g., group member 1 70a, group member n 70d) does receive a recall packet within the wait period, however, the destination client can thereafter attempt to authenticate the digitally signed recall packet based on the digital signature, as shown in blocks 118 and 120 of FIG. 11c. In this regard, the destination client can authenticate the recall packet using the public key of the private/public key pair associated with the destination client of the spoofed group member multicasting the recall packet (now a source member with respect to the recall packet). If the recall packet is authenticated, the destination client can interpret the recall packet notification, and recognizing that the decrypted data packet originated with a rogue member, and not with the source member identified in the content packet 73, drop the decrypted data packet from the data queue within the data store 82 of the destination member, as shown in blocks 122 and 124. If the recall packet is not authenticated, however, the destination client can continue to maintain the decrypted data packet in the data queue for a wait period (see block 108 of FIG. 11a), moving the decrypted data packet if the destination client does not receive and authenticate a recall packet within the wait period (see block 110).

Further, if the GCKS 25 is notified of the presence of a rogue member within the multicast group, such as by receiving the digitally signed recall packet to the GCKS, the GCKS can also attempt to authenticate the recall packet based upon the digital signature, as shown in blocks 126 and 128 of FIG.

11d. Like the destination client, the GCKS can authenticate the recall packet using the public key of the private/public key pair associated with the destination client of the spoofed group member multicasting the recall packet (again now a source member with respect to the recall packet). If the recall packet is authenticated, the GCKS can interpret the recall packet notification, and recognizing that the multicast group includes a rogue member, re-key or direct the key manager 68 to re-key the members of the group 70a-70d immediately, at the next instance of re-keying the members of the group, or at some other time after authenticating the recall packet, as shown in blocks 130 and 132. As indicated above, however, in contrast to previous key distributions, the key manager can distribute, to the members of the group other than the spoofed member, a different version of the symmetric key ($K_i$) associated with the spoofed member, as shown in FIG. 7. For example, when group member i is the spoofed member, the key manager can distribute different versions, $K_{i1}$, $K_{ij}$ and $K_{in}$, of the symmetric key associated with member i, with the versions being distributed to member 1, member j and member n, respectively. Thus, for example, destination member 74a (i.e., group member 1) can receive a set of symmetric keys including $K_1$ (the key associated with itself), $K_{i1}$ (a first version of the key associated with the spoofed group member i), $K_j$ (the key associated with group member j) and $K_n$ (the key associated with group member n). Similarly, source member 72 (i.e., rogue group member j) can receive a set of symmetric keys including $K_1$, $K_{ij}$ (a jth version of the key associated with the spoofed group member i), $K_j$ (the key associated with itself) and $K_n$; and destination member 74b (i.e., group member n) can receive a set of symmetric keys including $K_1$ (the key associated with group member 1), $K_{in}$ (a nth version of the key associated with the spoofed group member i), $K_j$ and $K_n$.

To permit the spoofed member (i.e., the member multicasting the recall packet 83) to identify the rogue member, the key manager 68 of the GCKS 25 can distribute, to the spoofed member of the group, a set of symmetric keys that includes all of the versions of the symmetric key ($K_i$) associated with itself, as also shown in FIG. 7. Continuing the above example, then, destination member 74c (i.e., group member i 70b) can receive a set of symmetric keys including $K_1$, $K_{i1}$, $K_{ij}$ and $K_{in}$, (the versions of the key associated with the spoofed group member i distributed to other members of the group), $K_j$ and $K_n$. As will be appreciated, at least one if not all of the different versions (e.g., $K_{i1}$, $K_{ij}$ and $K_{in}$) of the key associated with the spoofed group member (e.g., member i) will differ from a previous keying of the group members 70a-70d where all of the group members receive the same symmetric key (e.g., $K_i$) associated with the respective group member (see FIG. 4). The other symmetric keys associated with the other members of the group, however, may or may not differ from a previous keying of the group members, although the other symmetric keys of one typical embodiment do differ from one keying to the next.

As shown in FIG. 8a, at some point after the key manager 68 of the GCKS 25 re-keys the members 70a-70d of the multicast group, the rogue member (e.g., member j 70c) may again multicast a content packet 73 in a manner spoofing the identity of the same group member (e.g., member i 70b) as before (see FIGS. 6a and 10). In contrast to before, however, the code generated by the rogue member is generated based upon a different symmetric key associated with the spoofed member, due to the re-keying of the group members. In this regard, the content packet previously multicast by the rogue member included a code generated based upon a symmetric key (e.g., $K_i$) of the spoofed member known to all members of the multicast group, an example of which is, again, shown in FIG. 5b. The content packet now multicast by the rogue member, however, includes a code generated based upon the version of the symmetric key (e.g., $K_{ij}$) of the spoofed member known only to the rogue member and the spoofed member itself. For an example of such a content packet now multicast by the rogue member, see FIG. 8b (in contrast to the content packet shown in FIG. 5b).

Similar to before, each destination member receives the next multicast content packet 73 from the source member 72 (e.g., member j 70c) operating as a rogue member, as shown in block 134 of FIG. 1e. The multicast content packet in this instance includes an encrypted data packet and the member identifier of the spoofed member (e.g., member i 70b), as well as a MAC generated using the version of the symmetric key (e.g., $K_{ij}$) associated with the spoofed member which was distributed to the rogue member during the re-keying. Also similar to before, each destination member, or more particularly each destination client 80 of each destination member, can determine if the source member identifier in the content packet matches the destination member identifier of the respective destination member (instead of the source member that actually sent the content packet), as shown in block 136.

Presuming that the source member 72 is again operating as a rogue member, the destination clients 80 of the destination members 74 (e.g., group member 1 70a, group member n 70d) other than the spoofed destination member (e.g., group member i 70b) do not identify a match between the source member identifier (e.g., identifier of member i) and the destination member identifier. Thus, operating in a manner similar to before, the destination client can continue by generating a comparison MAC to compare with the MAC in the content packet 73. In this regard, the destination client can select a symmetric key to use in generating the comparison MAC based upon the source member identifier. Like the rogue, source member, however, the destination client of the destination member now has a version of the symmetric key of the spoofed member identified as the source member in the content packet, where that version is known only to the respective destination member and the spoofed member itself.

Thus, irrespective of the destination member 74, the respective destination client 80 generates a comparison MAC using a version of the symmetric key of the spoofed member that differs from the version used to generate the MAC in the content packet. Continuing the above example of re-keying the group members 70a-70d when group member j is the rogue member and group member i is the spoofed member, then, consider that group member j includes, in the content packet, a MAC generated using a jth version of the symmetric key associated with group member i (i.e., $K_{ij}$). The destination client of group member 1 operating as destination member 74a, on the other hand, generates a comparison MAC using a first version of the symmetric key associated with group member i (i.e., $K_{i1}$). Similarly, the destination client of group member n operating as destination member 74b generates a comparison MAC using a nth version of the symmetric key associated with group member i (i.e., $K_{in}$).

As shown again in block 102 of FIG. 11a, after generating the comparison MAC, the destination client 80 of the destination member 74 (e.g., group member 1 70a, group member n 70d) can compare the comparison MAC with the MAC in the content packet 73. However, as the destination client generates the comparison MAC using a version of the symmetric key of the spoofed member that differs from the version used to generate the MAC in the content packet, the destination client will typically not identify a match. As such, similar to before, the destination client fails to authenticate the source member (e.g., member j 70*b*), and can accordingly drop the encrypted packet, as again shown in block 104.

In contrast to the destination clients 80 of the other destination members 74 (e.g., group member 1 70*a*, group member n 70*d*), the destination client of the spoofed, destination member 74 (e.g., group member i 70*b*) can identify a match between the source member identifier and the member identifier of the respective destination member. Previously, the destination client of the spoofed, destination member generated and multicast a recall packet (RP) 83 to notify the other members of the multicast group (e.g., group member 170*a*, group member j and group member n 70*d*) that the source member 72 is a rogue member. In this instance, however, the destination client need not multicast a recall packet since, as explained above, the other destination members of the multicast group already operate in a manner that fails to authenticate the source member. Instead, the destination client of the spoofed, destination member can identify the rogue, source member 72 based upon the MAC.

More particularly, the destination client 80 of the spoofed, destination member (e.g., group member i 70*b*) can identify the version of the symmetric key (e.g., $K_{i1}$, $K_{ij}$ or $K_{in}$) associated with the respective destination member, which was also distributed to the rogue, source member and used to generate the MAC (e.g., $K_{ij}$). The destination client can identify the rogue member (e.g., member j 70*c*) based upon the identified version of the symmetric key, as shown in block 138 of FIG. 11*e*, since only the rogue member and the respective spoofed, destination member received that version of the symmetric key. The destination client can identify the respective version of the symmetric key in any of a number of different manners. For example, the destination client can generate different comparison MACs using the different versions of the symmetric key associated with the respective destination member until the destination client identifies a match between the comparison MAC and the MAC in the content packet 73. Then, having knowledge of which group members received which versions of the symmetric keys associated with the spoofed, destination member, the destination client can then identify the rogue member as being the group member receiving the version of the symmetric key used to generate a matching comparison MAC.

Irrespective of exactly how the destination client 80 of the spoofed, destination member (e.g., group member i 70*b*) identifies the rogue member (e.g., member j 70*c*), the destination client can thereafter notify the GCKS 25 of the identity of the rogue member. The destination client can notify the GCKS in any of a number of different manners, such as by generating and sending a notification packet (NP) 85 to the GCKS where the notification packet includes the identity of the rogue member, as shown in FIG. 8*a* and block 140 of FIG. 11*e*. The notification packet can be generated in any of a number of different manners, and include any of a number of different pieces of information. In one embodiment, for example, the notification packet is generated in a manner similar to a recall packet 83, including a notification identifying the rogue member. Also like the recall packet, to provide increased security for such notification packets, the destination client can digitally sign the notification packet, such as with the private key of the public/private key pair associated with the respective destination member.

Figures 11E, 11F:
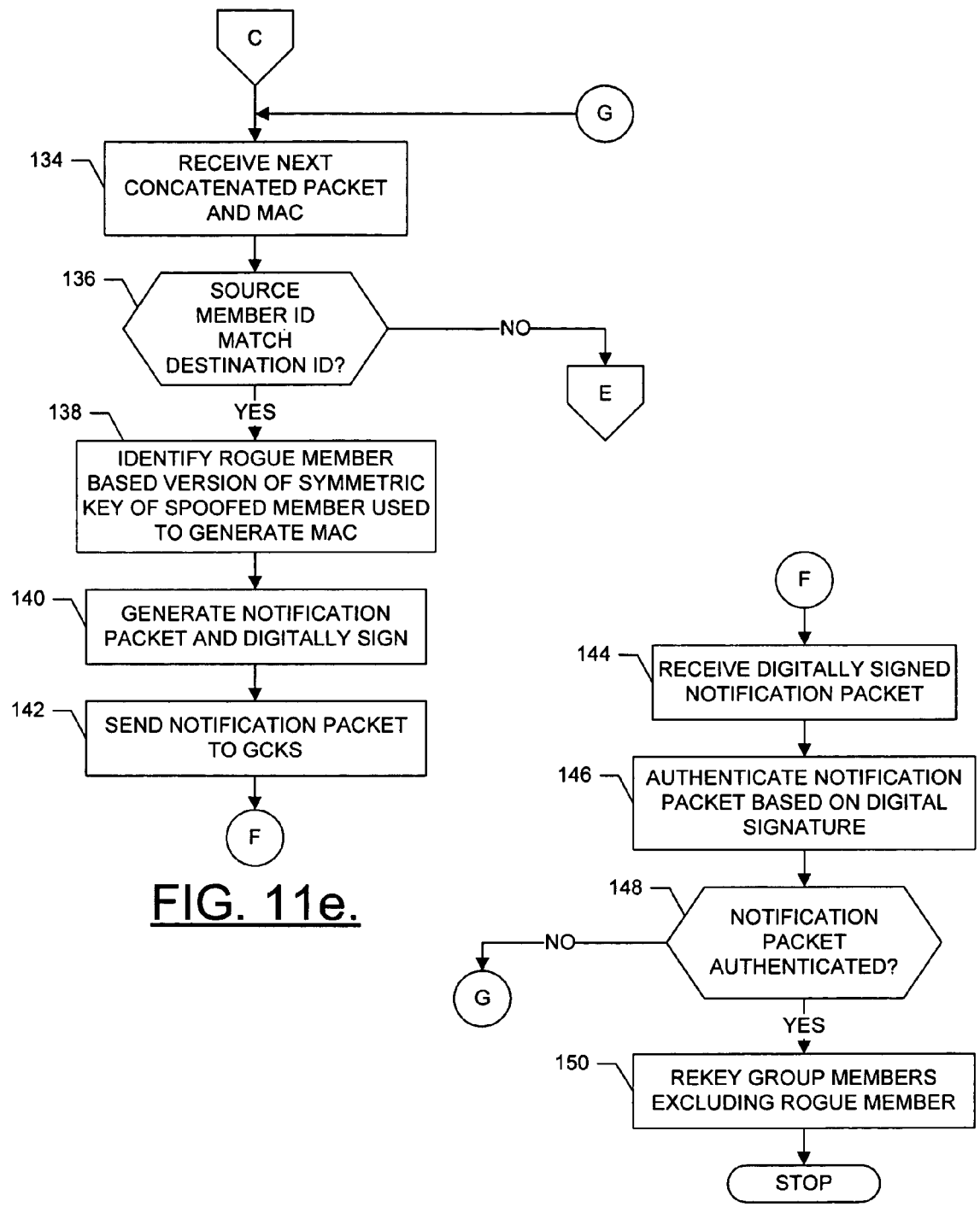

After digitally signing the notification packet 85, the destination client 80 of the respective destination member 74 (e.g., group member i 70*b*) can send the digitally signed notification packet to the GCKS 25, as shown in FIG. 8*a* and block 142 of FIG. 11*e*. Like receiving a recall packet, the GCKS can receive the digitally signed notification packet and thereafter attempt to authenticate the notification packet based upon the digital signature, as shown in blocks 144 and 146 of FIG. 11*f*. In this regard, the GCKS can authenticate the notification packet using the public key of the private/public key pair associated with the destination client of the respective destination member. If the recall packet is authenticated, the GCKS can interpret the recall packet notification, and recognizing the identity of the rogue member (e.g., member j 70*c*), re-key or direct the key manager 68 to re-key the members of the group, such as immediately after recognizing the identity of the rogue member or at some other time after authenticating the notification packet, as shown in blocks 148 and 150.

The members of the multicast group can again be re-keyed in a number of different manners, such as in a manner similar to that shown in FIG. 4. In contrast to the instance shown in FIG. 4, however, the GCKS can remove the rogue member from the multicast group by directing the key manager 68 to distribute a new set of symmetric keys to the other members of the multicast group and not to the identified rogue member, as shown in FIG. 9. Thus, as shown for the case where member j 70*c* is identified as the rogue member, for example, the key manager can distribute a new set of symmetric keys to member 1 70*a*, member i 70*b* and member n 70*c*, but not distribute a set of symmetric keys to member j (now a former member of the multicast group). In the illustrated example, the set of symmetric keys includes a new symmetric key associated with each member of the multicast group (i.e., $K'_1$, $K'_i$, $K'_n$), but does not include a symmetric key associated with former member j (i.e., $K'_j$). Although the symmetric keys associated with one or more members of the multicast group may not change from one re-keying to the next, the symmetric keys associated with all of the members do typically change during a re-keying of the members after identifying a rogue member such that the rogue member does not have knowledge of the symmetric keys associated with the members of the multicast group.

The preceding description presumes that, at some point after the key manager 68 of the GCKS 25 re-keys the members 70*a*-70*d* of the multicast group, the rogue member (e.g., member j 70*c*) again multicasts a content packet 73 in a manner spoofing the identity of the same group member (e.g., member i 70*b*). It should be understood, however, that in various instances the rogue member may not again multicast a content packet spoofing the identity of the same group member, or may only spoof the same group member after a significant period of time. Thus, the GCKS may be configured to wait a period of time to receive a notification packet 85 from the destination client 80 of the spoofed, destination member 74. For example, the GCKS may be configured to wait a period of time from one instance of re-keying the members of the group to the next instance of re-keying the members of the group. Then, if the GCKS has not received a notification packet after the period of time, the GCKS can respond by re-keying the members of the group, and again including, in the set of symmetric keys, the same symmetric key associated with the spoofed, destination member (see FIG. 4 and block 84 of FIG. 10). Thus, the multicast group may be restored to typical operation as though the rogue member had not previously spoofed another member of the group.

As described above, the source client 76 of the source member 72 can add or otherwise concatenate the data packet (encrypted or otherwise) with an identifier (ID) associated with the source member. The destination members can then utilize the source member identifier to determine if the source member is spoofing the identity of the respective destination members, and to select the symmetric key associated with the source member and authenticate the source member based upon the respective symmetric key (i.e., by generating a comparison MAC using the respective symmetric key). It should be noted, however, that the source client need not add or concatenate the source member identifier to the data packet. In such an instance, the destination members can determine the source member identifier by generating and comparing a comparison MAC based upon the symmetric key associated with each other member of the multicast group until a comparison MAC matches the MAC of the content packet. Each destination member can also determine if the source member is spoofing the identity of the destination member by generating a comparison MAC based upon the destination member symmetric key, and comparing the comparison MAC to the MAC of the content packet. If the destination member identifies a match, the source member spoofed the identity of the destination member.

As also described above, the source client 76 of the source member 72 can generate a content packet by encrypting a data packet, concatenating the data packet to the source member identifier, hashing the concatenated packet, and generating a MAC based upon the hashed, concatenated packet based upon the source member identifier. It should also be understood that the steps of generating the content packet can occur in one or more alternative orders, if so desired. For example, the source client can generate a content packet by hashing a data packet, concatenating the hashed data packet with the source member identifier, and generating a MAC based upon the concatenated packet based upon the source member identifier. In either event, however, the source client can, but need not, hash the concatenated packet or data packet.

As shown and explained herein, the multicast group includes a source member 72 and a plurality of destination members 74. It should be understood, however, that at any given time, more than one group member 70 can operate as a source member to effectuate multi-sender multicasting. In such instances, the multicast group can include a plurality of source members and at least one, if not a plurality of, destination members.

Further, as explained above, the key manager 68 of the GCKS 25 distributes, to the spoofed member of the multicast group (i.e., the member multicasting the recall packet 83), a set of symmetric keys that includes all of the versions of the symmetric key ($K_i$) associated with itself, thereby permitting the spoofed member to identify the rogue member. It should be understood that any one or more of a number of other network entities can equally operate to receive all of the versions of the symmetric keys and identify the rogue member. For example, the GCKS can itself receive or otherwise maintain all of the versions of the symmetric keys. In such an instance, after the destination client 80 of the spoofed, destination member 74 (e.g., group member i 70b) identifies a match between the source member identifier and the member identifier of the respective destination member (see block 136), the destination client can generate and digitally sign a notification packet 85, as before. The notification packet in this instance, however, can include the MAC from the content packet 73 received by the destination client, as opposed to the identity of the rogue member. The GCKS can then identify the rogue member based upon the MAC from the content packet, such as in the same manner explained above with respect to the destination client of the spoofed, destination member.

According to one aspect of the present invention, such all or a portion of the system of the present invention, such all or portions of the GCKS 25, source member 72 and/or destination members 74, generally operate under control of a computer program product (e.g., key manager 68, source client 76, destination clients 80, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 10 and 11a-11f are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:

a processor configured to receive, from a member of a multicast group comprising a plurality of members, notification of a member of the group operating as a rogue member claiming an identity of another member of the group, that other member of the group being a spoofed member, wherein, in response to receiving the notification, the processor is configured to distribute, to at least the members of the group other than the spoofed member, different versions of a symmetric key associated with the spoofed member, the member from which the notification is received being configured to receive a next data packet and a code for the next data packet, the code having been generated at the rogue member using a version of the symmetric key associated with the spoofed member such that the rogue member is identifiable based upon the version of the symmetric key.

2. An apparatus according to claim 1, wherein the member from which the notification is received is further configured to receive a data packet and
   determine if the received data packet has been multicast from a member of the group operating as a rogue member, and
   wherein the processor is configured to receive further notification from the respective member when, the respective member determines received data packet has been multicast from the rogue member.

3. An apparatus according to claim 1, wherein the processor is further configured to identify the rogue member based upon the version of the symmetric key used to generate the code for the next data packet.

4. An apparatus according to claim 3, wherein the processor is further configured to exclude the rogue member from the multicast group after the rogue member has been identified.

5. An apparatus according to claim 3, wherein in response to receiving the notification, the processor is also configured to distribute, to the spoofed member, all of the different versions of a symmetric key associated with the spoofed member, the processor being configured to distribute all of the different versions of the symmetric key to thereby facilitate the respective member identifying the rogue member.

6. An apparatus according to claim 1, wherein at least one member of the multicast group is configured to operate as a destination member to receive a data packet and a code for the data packet from another member of the group operating as a source member, the code having been generated at the source member using a symmetric key associated with the source member, wherein the destination member is configured to determine if the received data packet has been multicast from a member of the group operating as a rogue member, wherein the destination member is configured to multicast a recall packet to the members of the multicast group when the received data packet has been multicast from a rogue member, and otherwise, authenticate the source member based upon the code associated with the data packet, and
   wherein the processor is configured to receive notification from the destination member when the destination member determines the received data packet has been multicast from the rogue member.

7. An apparatus configured to function as a member of a multicast group including a plurality of members, wherein the apparatus comprises:
   a processor configured to notify a network entity of a member of the group operating as a rogue member claiming an identity of another member of the group, that other member being a spoofed member, wherein the processor is configured to notify the network entity such that the network entity distributes, to at least the members of the group other than the spoofed member, different versions of a symmetric key associated with the spoofed member, and
   wherein the processor is configured to receive a next data packet and a code for the next data packet, the code having been generated at the rogue member using a version of the symmetric key associated with the spoofed member such that the rogue member is identifiable based upon the version of the symmetric key.

8. An apparatus according to claim 7, wherein the processor is further configured to receive a data packet and determine if the received data packet has been multicast from a member of the group operating as a rogue member, and wherein the processor is configured to notify the network entity when the processor determines the received data packet has been multicast from the rogue member.

9. An apparatus according to claim 8, wherein the processor is configured to receive a content packet comprising the data packet, a code for the data packet, and a member identifier, and wherein the processor is configured to determine if the received data packet has been multicast from a rogue member by comparing the member identifier in the content packet and a member identifier associated with the member receiving the content packet, and determine that the received data packet has been multicast from a rogue member when the comparison identifies a match between the member identifier in the content packet to the member identifier associated with the member receiving the content packet.

10. An apparatus according to claim 7, wherein the processor is further configured to identify the rogue member based upon the version of the symmetric key used to generate the code for the next data packet.

11. An apparatus according to claim 10, wherein the processor is further configured to notify the network entity of the identity of the rogue member to enable the network entity to thereafter exclude the rogue member from the multicast group.

12. An apparatus according to claim 10, wherein the processor is configured to receive all of the different versions of a symmetric key associated with the spoofed member to thereby facilitate the processor identifying the rogue member.

13. An apparatus according to claim 7, wherein the processor is further configured to receive a data packet and a code for the data packet from a member of the group operating as a source member, the code having been generated at the source member using a symmetric key associated with the source member,
   wherein the processor is configured to determine if the received data packet has been multicast from a member of the group operating as a rogue member,
   wherein the processor is configured to multicast a recall packet to the members of the multicast group when the received data packet has been multicast from a rogue member, and otherwise, authenticate the source member based upon the code associated with the data packet, and
   wherein the processor is configured to notify the network entity when the processor determines the received data packet has been multicast from the rogue member.

14. A method of identifying a rogue member within a multicast group including a plurality of members, wherein, for at least one member of the group, the method comprises:
   notifying a network entity of a member of the group operating as a rogue member claiming an identity of another member of the group, that other member being a spoofed member, wherein notifying a network entity comprises notifying a network entity such that the network entity distributes, to at least the members of the group other than the spoofed member, different versions of a symmetric key associated with the spoofed member; and
   receiving a next data packet and a code for the next data packet, the code having been generated at the rogue member using a version of the symmetric key associated with the spoofed member such that the rogue member is capable of being identified based upon the version of the symmetric key.

15. A method according to claim 14 further comprising: receiving a data packet; and determining if the received data packet has been multicast from a member of the group operating as a rogue member, wherein notifying a network entity comprises notifying a network entity when, and in response to determining that, the received data packet has been multicast from the rogue member.

16. A method according to claim 15, wherein receiving a data packet comprises receiving a content packet comprising a data packet, a code for the data packet, and a member identifier, and wherein determining if the received data packet has been multicast from a rogue member comprises:
comparing the member identifier in the content packet and a member identifier associated with the member receiving the content packet; and
determining that the received data packet has been multicast from a rogue member when the comparison identifies a match between the member identifier in the content packet to the member identifier associated with the member receiving the content packet.

17. A method according to claim 14 further comprising:
identifying the rogue member based upon the version of the symmetric key used to generate the code for the next data packet.

18. A method according to claim 17 further comprising:
notifying the network entity of the identity of the rogue member such that the network entity is capable of thereafter excluding the rogue member from the multicast group.

19. A method according to claim 17 further comprising:
receiving all of the different versions of a symmetric key associated with the spoofed member to thereby facilitate identifying the rogue member.

20. A method according to claim 14 further comprising:
receiving a data packet and a code for the data packet from a member of the group operating as a source member, the code having been generated at the source member using a symmetric key associated with the source member;
determining if the received data packet has been multicast from a member of the group operating as a rogue member;
multicasting a recall packet to the members of the multicast group when the received data packet has been multicast from a rogue member; and otherwise,
authenticating the source member based upon the code associated with the data packet,
wherein notifying a network entity comprises notifying a network entity when, and in response to determining that, the received data packet has been multicast from the rogue member.

21. A computer program product for identifying a rogue member within a multicast group including a plurality of members, wherein the computer program product is adapted to be embodied within at least one member of the group, and wherein the computer program product comprises at least one computer-readable storage medium having computer-readable program code portions stored therein, the computer-readable program code portions comprising:
a first executable portion for notifying a network entity of a member of the group operating as a rogue member claiming an identity of another member of the group, that member being a spoofed member, wherein the first executable portion is adapted to notify the network entity such that the network entity distributes, to at least the members of the group other than the spoofed member, different versions of a symmetric key associated with the spoofed member; and
a second executable portion for receiving a next data packet and a code for the next data packet, the code having been generated at the rogue member using a version of the symmetric key associated with the spoofed member such that the rogue member is capable of being identified based upon the version of the symmetric key.

22. A computer program product according to claim 21 further comprising:
a third executable portion for receiving a data packet; and
a fourth executable portion for determining if the received data packet has been multicast from a member of the group operating as a rogue member,
wherein the first executable portion is adapted to notify the network entity when, and in response to the fourth executable portion determining that, the received data packet has been multicast from the rogue member.

23. A computer program product according to claim 22, wherein the third executable portion is adapted to receive a content packet comprising the data packet, a code for the data packet, and a member identifier, and wherein the fourth executable portion is adapted to compare the member identifier in the content packet and a member identifier associated with the member receiving the content packet, and determine that the received data packet has been multicast from a rogue member when the comparison identifies a match between the member identifier in the content packet to the member identifier associated with the member receiving the content packet.

24. A computer program product according to claim 21 further comprising:
a third executable portion for identifying the rogue member based upon the version of the symmetric key used to generate the code for the next data packet.

25. A computer program product according to claim 24 further comprising:
a fourth executable portion for notifying the network entity of the identity of the rogue member such that the network entity is capable of thereafter excluding the rogue member from the multicast group.

26. A computer program product according to claim 24 further comprising:
a fourth executable portion for receiving all of the different versions of a symmetric key associated with the spoofed member to thereby facilitate the third executable portion identifying the rogue member.

27. A computer program product according to claim 21 further comprising:
a third executable portion for receiving a data packet and a code for the data packet from a member of the group operating as a source member, the code having been generated at the source member using a symmetric key associated with the source member;
a fourth executable portion for determining if the received data packet has been multicast from a member of the group operating as a rogue member; and
a fifth executable portion for multicasting a recall packet to the members of the multicast group when the received data packet has been multicast from a rogue member, and otherwise, authenticating the source member based upon the code associated with the data packet,
wherein the first executable portion is adapted to notify the network entity when, and in response to the fourth executable portion determining that, the received data packet has been multicast from the rogue member.

* * * * *